(12) United States Patent
Tang et al.

(10) Patent No.: US 9,052,491 B2
(45) Date of Patent: Jun. 9, 2015

(54) IMAGING LENS ASSEMBLY

(71) Applicant: LARGAN PRECISION CO., LTD., Taichung (TW)

(72) Inventors: Hsiang-Chi Tang, Taichung (TW); Po-Lun Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 223 days.

(21) Appl. No.: 13/861,380

(22) Filed: Apr. 12, 2013

(65) Prior Publication Data

US 2014/0285907 A1     Sep. 25, 2014

(30) Foreign Application Priority Data

Mar. 20, 2013  (TW) .............................. 102109885 A

(51) Int. Cl.
*G02B 9/60* (2006.01)
*G02B 13/00* (2006.01)
*G02B 13/18* (2006.01)

(52) U.S. Cl.
CPC ............ *G02B 13/0045* (2013.01); *G02B 13/18* (2013.01); *G02B 9/60* (2013.01)

(58) Field of Classification Search
CPC .............................. G02B 9/60; G02B 13/0045
USPC ................................................. 359/714, 763
See application file for complete search history.

(56) References Cited

U.S. PATENT DOCUMENTS

| 7,869,142 | B2 | 1/2011 | Chen et al. |
| 8,189,273 | B2 | 5/2012 | Noda |
| 8,400,716 | B2* | 3/2013 | Jeong .............................. 359/714 |
| 8,675,288 | B2* | 3/2014 | Jung et al. ...................... 359/714 |
| 2013/0285164 | A1 | 10/2013 | Saito et al. |
| 2014/0015991 | A1* | 1/2014 | Yamada et al. ............... 359/714 |
| 2014/0092488 | A1 | 4/2014 | Liang |
| 2014/0104700 | A1 | 4/2014 | Chang et al. |
| 2014/0204480 | A1 | 7/2014 | Jo et al. |

* cited by examiner

*Primary Examiner* — Zachary Wilkes
(74) *Attorney, Agent, or Firm* — CKC & Partners Co., Ltd.

(57) ABSTRACT

An imaging lens assembly includes, in order from an object side to an image side, a first lens element, a second lens element, a third lens element, a fourth lens element and a fifth lens element. The imaging lens assembly has five non-cemented lens elements with refractive power and further includes a stop located between an imaged object and the first lens element. The first lens element with positive refractive power has a convex object-side surface. The second through fifth lens elements all have refractive power. The third lens element has a convex image-side surface. The fifth lens element has a concave image-side surface at a paraxial region thereof, wherein the image-side surface of the fifth lens element has a convex shape at a peripheral region thereof, and both of an object-side surface and the image-side surface of the fifth lens element are aspheric.

35 Claims, 15 Drawing Sheets

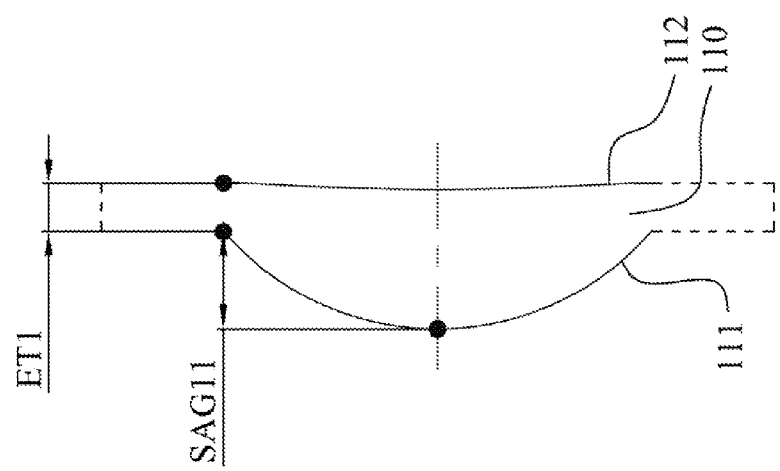

ial Number 102109885, filed Mar. 20, 2013, which is
IMAGING LENS ASSEMBLY

RELATED APPLICATIONS

The application claims priority to Taiwan Application Serial Number 102109885, filed Mar. 20, 2013, which is herein incorporated by reference.

BACKGROUND

1. Technical Field

The present disclosure relates to an imaging lens assembly. More particularly, the present disclosure relates to a miniaturized imaging lens assembly applicable to electronic products.

2. Description of Related Art

In recent years, with the popularity of mobile products having camera functionalities, a demand for optical system is increasing. A photosensitive sensor of a conventional optical system is typically a CCD (Charge-Coupled Device) or a CMOS (Complementary Metal-Oxide-Semiconductor) sensor. As the advanced semiconductor manufacturing technologies have allowed a pixel size of sensors to be reduced and the optical systems have gradually evolved toward a field of higher megapixels, there is an increasing demand for better image quality.

A conventional optical system employed in a portable electronic product, as shown in U.S. Pat. No. 7,869,142, mainly adopts a structure of four lens elements. Due to the popularity of mobile products with high-end specifications, such as smart phones and PDAs (Personal Digital Assistants), requirements of higher megapixels and better image quality have been increasing rapidly. However, the conventional optical systems cannot satisfy the requirements of high-end optical systems with camera functionalities.

A conventional optical system with five lens elements, such as the U.S. Pat. No. 8,189,273, does not equip with effective light gathering ability so as to further reduce the total track length of the imaging lens assembly due to the disposition of the stop and the surface design of its first lens element. This optical system is thereby not favorable for being applied to the compact and portable devices.

SUMMARY

According to one aspect of the present disclosure, an imaging lens assembly includes, in order from an object side to an image side, a first lens element, a second lens element, a third lens element, a fourth lens element and a fifth lens element. The imaging lens assembly has five non-cemented lens elements with refractive power. The first lens element with positive refractive power has a convex object-side surface. The second lens element has refractive power. The third lens element with refractive power has a convex image-side surface. The fourth lens element has refractive power. The fifth lens element with refractive power has a concave image-side surface at a paraxial region thereof, wherein the image-side surface of the fifth lens element has a convex shape at a peripheral region thereof, and both of an object-side surface and the image-side surface of the fifth lens element are aspheric. The imaging lens assembly further comprises a stop located between an imaged object and the first lens element. When a distance in a direction parallel with an optical axis from an axial vertex on the object-side surface of the first lens element to a maximum effective diameter position on the object-side surface of the first lens element is SAG11, a shortest distance in a direction parallel with the optical axis between the object-side surface of the first lens element and an image-side surface of the first lens element is ET1, a focal length of the first lens element is f1, a focal length of the third lens element is f3, a curvature radius of an image-side surface of the second lens element is R4, and a focal length of the fourth lens element is f4, the following relationships are satisfied:

$$1.75 < SAG11/ET1;$$

$$0 \leq |f1/f3| < 0.8; \text{ and}$$

$$R4/f4 < 0.$$

According to another aspect of the present disclosure, an imaging lens assembly includes, in order from an object side to an image side, a first lens element, a second lens element, a third lens element, a fourth lens element and a fifth lens element. The imaging lens assembly has five non-cemented lens elements with refractive power. The first lens element with positive refractive power has a convex object-side surface. The second lens element has refractive power. The third lens element has refractive power. The fourth lens element has refractive power. The fifth lens element with refractive power has a concave image-side surface at a paraxial region thereof, wherein the image-side surface of the fifth lens element has a convex shape at a peripheral region thereof, and both of an object-side surface and the image-side surface of the fifth lens element are aspheric. The imaging lens assembly further includes a stop located between an imaged object and the first lens element. When a distance in a direction parallel with an optical axis from an axial vertex on the object-side surface of the first lens element to a maximum effective diameter position on the object-side surface of the first lens element is SAG11, a shortest distance direction parallel with the optical axis between the object-side surface of the first lens element and an image-side surface of the first lens element ET1, a focal length of the first lens element is f1, a focal length of the third lens element is f3, an axial distance between the object-side surface of the first lens element and the stop is Dr1s, and a central thickness of the first lens element is CT1, the following relationships are satisfied:

$$1.75 < SAG11/ET1;$$

$$0 < |f1/f3| < 0.8; \text{ and}$$

$$0.50 < Dr1s/CT1 < 0.85.$$

BRIEF DESCRIPTION OF THE DRAWINGS

The disclosure can be more fully understood by reading the following detailed description of the embodiments, with reference made to the accompanying drawings as follows:

FIG. 15 shows SAG11 and ET1 of the first lens element of the imaging lens assembly according to the FIG. 1.

DETAILED DESCRIPTION

Figure 1:
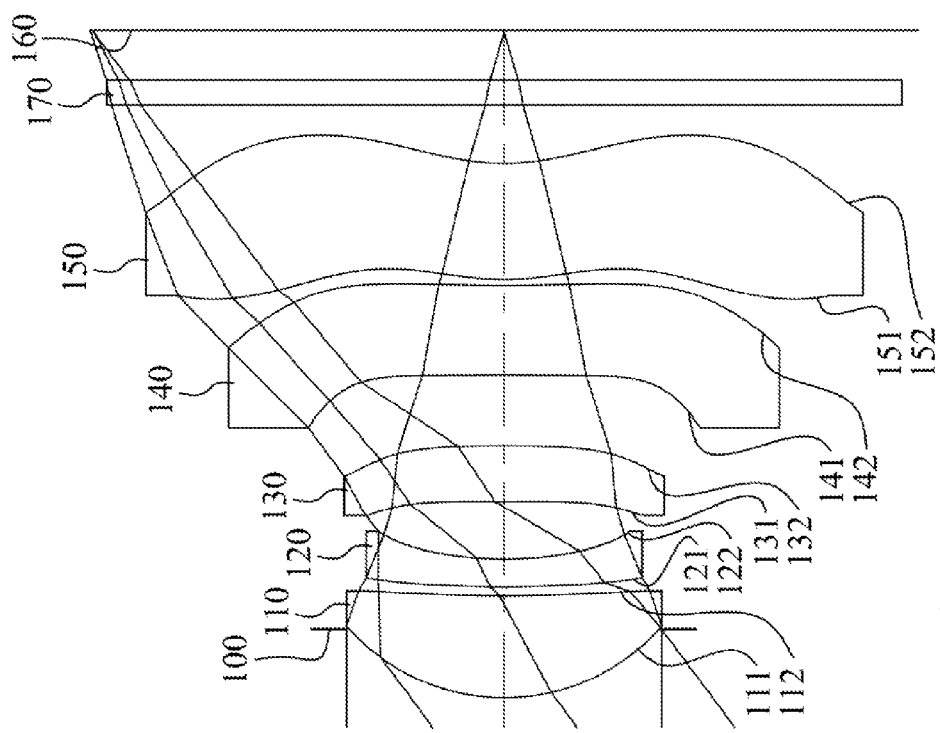
FIG. 1 is a schematic view of an imaging lens assembly according to the 1st embodiment of the present disclosure.

An imaging lens assembly includes, in order from an object side to an image side, a first lens element, a second lens element, a third lens element, a fourth lens element and a fifth lens element. The imaging lens assembly has five non-cemented lens elements with refractive power and further includes a stop located between an imaged object and the first lens element.

The imaging lens assembly has five non-cemented lens elements with refractive power. That is, any two lens elements adjacent to each other are not cemented, and there is an air space between the two lens elements. Moreover, the manufacturing process of the cemented lenses is more complex than the non-cemented lenses. In particular, a second surface of one lens and a first surface of the following lens need to have accurate curvature to ensure these two lens elements will be highly cemented. However, during the cementing process, those two lens elements might not be highly cemented due to displacement and it is thereby not favorable for the image quality of the imaging lens assembly. Therefore, the imaging lens assembly of the present disclosure provides five non-cemented lens elements for improving the problem generated by the cemented lens elements.

The first lens element with positive refractive power has a convex object-side surface, so that a total track length of the imaging lens assembly can be reduced by properly adjusting the positive refractive power of the first lens element.

The second lens element with negative refractive power can have a concave image-side surface, so that an aberration generated by the first lens element can be corrected.

The third lens element can have a convex image-side surface, so that the photosensitivity of the imaging lens assembly can be reduced.

The fifth lens element can have a convex object-side surface and has a concave image-side surface at a paraxial region thereof, wherein the image-side surface of the fifth lens element has a convex shape at a peripheral region thereof. Therefore, a principal point of the imaging lens assembly can be positioned away from the image plane for reducing a back focal length so as to maintain a compact size thereof. Moreover, an angle at which the incident light projects onto an image sensor from the off-axis can be effectively reduced so as to further correct the aberration of the off-axis.

When a distance in a direction parallel with an optical axis from an axial vertex on the object-side surface of he first lens element to a maximum effective diameter position on the object-side surface of the first lens element is SAG11 (When the distance towards the object side of the imaging lens assembly is negative, and when the distance towards the image side of the imaging lens assembly is positive.), and a shortest distance in a direction parallel with the optical axis between the object-side surface of the first lens element and the image-side surface of the first lens element is ET1 (The range of ET1 is not limited to the effective area on both of the object-side surface and the image-side surface of the first lens element.), the following relationship is satisfied: 1.75<SAG11/ET1. Therefore, the first lens element offers better light gathering ability since the imaging lens assembly is equipped with large aperture so as to provide favorable arrangement of the refractive power of the first lens element and to further reduce the total track length. Preferably, the following relationship is satisfied: 1.85<SAG11/ET1 <5.0. More preferably, the following relationship is satisfied: 1.85<SAG11/ET1<3.0.

When a focal length of the first lens element is f1, and a focal length of the third lens element is f3, the following relationship is satisfied: 0<f1/|f3|<0.8. Therefore, it is favorable for balancing the refractive power between the first lens element and the third lens element so as to avoid excessive spherical aberration.

When a curvature radius of the image-side surface of the second lens element is R4, and a focal length of the fourth lens element is f4, the following relationship is satisfied: R4/f4<0. Therefore, it is favorable for reducing the aberration of the imaging lens assembly.

When an axial distance between the object-side surface of the first lens element and the stop is Dr1s, and a central thickness of the first lens element is CT1, the following relationship is satisfied: 0.50<Dr1s/CT1<0.85. Therefore, it is favorable for improving the light gathering ability of the first lens element. Preferably, the following relationship is satisfied: 0.60<Dr1s/CT1<0.80.

When an axial distance between the object-side surface of the first lens element and the image plane is TTL, and an axial distance between the stop and the image plane is SL, the following relationship is satisfied: 0.85<SL/TTL<0.95. Therefore, it is favorable for making a balance between the telecentric and wide-angle qualities so as to keep a proper total track length for the imaging lens assembly.

When an axial distance between the first lens element and the second lens element is T12, and the central thickness of the first lens element is CT1, the following relationship is satisfied: 0.02<T12/CT1<0.15. Therefore, it is favorable for manufacturing and assembling the lens elements to improve the manufacturing yield rate.

When a curvature radius of the object-side surface of the first lens element is R1, and a curvature radius of the image-side surface of the first lens element is R2, the following relationship is satisfied: −2.0<(R1+R2)/(R1−R2)<−0.90. Therefore, it is favorable for reducing the spherical aberration.

When an axial distance between the object-side surface of the first lens element and the image-side surface of the fifth lens element is Td, and an entrance pupil diameter of the imaging lens assembly is EPD, the following relationship is satisfied: 1.3<Td/EPD<2.2. Therefore, it is favorable for increasing the exposure of the imaging lens assembly and keeping the imaging lens assembly compact. Preferably, the following relationship is satisfied: 1.3<Td/EPD<2.0. More preferably, the following relationship is satisfied: 1.3<Td/EPD<1.85.

When a focal length of the imaging lens assembly is f, the focal length of the third lens element is f3, the focal length of the fourth lens element is f4, and a focal length of the fifth lens element is f5, the following relationship is satisfied: 0<|f/f3|+|f/f4|+|f/f5|<2.0. Therefore, it is favorable for balancing the refractive power of the imaging lens assembly so as to effectively correct the aberration. Preferably, the following relationship is satisfied: 0.2<|f/f3|+|f/f4|+|f/f5|<1.0.

When a central thickness of the fourth lens element is CT4, and a central thickness of the fifth lens element is CT5, the following relationship is satisfied: 0.15<CT4/CT5<0.90. Therefore, it is favorable for avoiding the lens elements from being deformed so as to increase the manufacturing yield rate.

When the central thickness of the first lens element is CT1, and a central thickness of the second lens element is CT2, the following relationship is satisfied: 2.5<CT1/CT2<4.5. Therefore, it provides favorable moldability and homogeneity for plastic lens elements during the injection molding process so as to increase the manufacturing yield rate.

When the axial distance between the object-side surface of the first lens element and the image plane is TTL, and the focal length of the imaging lens assembly is f, the following relationship is satisfied: TTL/f<1.25. Therefore, it is favorable for keeping the imaging lens assembly compact.

When the focal length of the imaging lens assembly is f, a curvature radius of the object-side surface of the fourth lens element is R7, and a curvature radius of the image-side surface of the fourth lens element is R8, the following relationship is satisfied: 0<f/|R7|+f/|R8|<3.0. Therefore, it is favorable for effectively correcting the Petzval Sum of the imaging lens assembly so as to improve the resolving power.

According to the imaging lens assembly of the present disclosure, the lens elements can be made of plastic or glass material. When the lens elements are made of glass material, the distribution of the refractive power of the imaging lens assembly can be more flexible to design. When the lens elements are made of plastic material, the manufacturing cost thereof can be decreased. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Thus, the total track length of the imaging lens assembly can be effectively reduced.

According to the imaging lens assembly of the present disclosure, each of an object-side surface and an image-side surface of every lens element has a paraxial region thereof and a peripheral region thereof. The paraxial region thereof refers to the region of the surface where light rays travel close to an optical axis and the peripheral region thereof refers to the region of the surface where light rays travel away from the optical axis. Particularly, when the lens element has a convex surface, it indicates that the surface is convex at the paraxial region thereof; and when the lens element has a concave surface, it indicates that the surface is concave at the paraxial region thereof.

According to the imaging lens assembly of the present disclosure, the imaging lens assembly can include at least one stop, such as an aperture stop, a glare stop or a field stop. Said glare stop or said field stop is for eliminating the stray light and thereby improving the image resolution thereof.

According to the imaging lens assembly of the present disclosure, an aperture stop can be configured as a front stop or a middle stop. A front stop disposed between an imaged object and a first lens element can provide a longer distance between an exit pupil of the system and an image plane and which improves the image-sensing efficiency of an image sensor. A middle stop disposed between the first lens element and an image plane is favorable for enlarging the field of view of the system and thereby provides a wider field of view for the same.

According to the imaging lens assembly of the present disclosure, the imaging lens assembly is featured with good correction ability and high image quality, and can be applied to 3D (three-dimensional) image capturing applications, in products such as digital cameras, mobile devices and tablets.

According to the above description of the present disclosure, the following 1st-7th specific embodiments are provided for further explanation.

1st Embodiment

Figure 2:
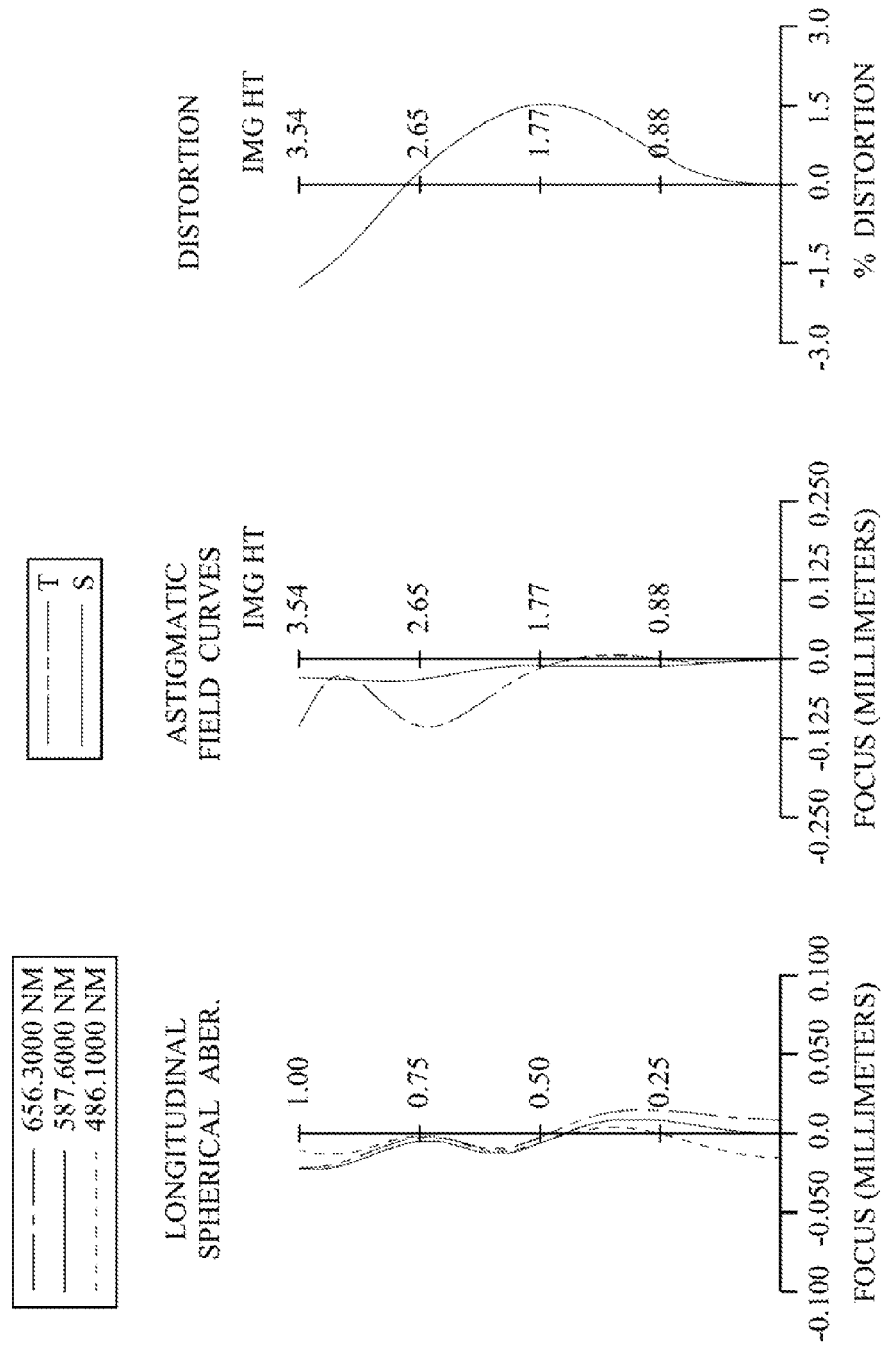
FIG. 2 shows, in order from left to right, spherical aberration curves, astigmatic field curves and a distortion curve of the imaging lens assembly according to the 1st embodiment.

FIG. 1 is a schematic view of an imaging lens assembly according to the 1st embodiment of the present disclosure. FIG. 2 shows, in order from left to right, spherical aberration curves, astigmatic field curves and a distortion curve of the imaging lens assembly according to the 1st embodiment.

In FIG. 1, the imaging lens assembly includes, in order from an object side to an image side, an aperture stop 100, a first lens element 110, a second lens element 120, a third lens element 130, a fourth lens element 140, a fifth lens element 150, an IR-cut filter 170 and an image plane 160, wherein the imaging lens assembly has five non-cemented lens elements (110-150) with refractive power.

The first lens element 110 with positive refractive power has a convex object-side surface 111 and a concave image-side surface 112, which are both aspheric, and the first lens element 110 is made of glass material.

The second lens element 120 with negative refractive power has a convex object-side surface 121 and a concave image-side surface 122, which are both aspheric, and the second lens element 120 is made of plastic material.

The third lens element 130 with positive refractive power has a convex object-side surface 131 and a convex image-side surface 132, which are both aspheric, and the third lens element 130 is made of plastic material.

The fourth lens element 140 with negative refractive power has a concave object-side surface 141 and a concave image-side surface 142, which are both aspheric, and the fourth lens element 140 is made of plastic material.

The fifth lens element 150 with positive refractive power has a convex object-side surface 151 and a concave image-side surface 152, which are both aspheric, and the fifth lens element 150 is made of plastic material. Moreover, the image-side surface 152 of the fifth lens element 150 has a convex shape at a peripheral region thereof.

The IR-cut filter 170 is made of glass and located between the fifth lens element 150 and the image plane 160, and will not affect the focal length of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

wherein,

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the imaging lens assembly according to the 1st embodiment, when a focal length of the imaging lens assembly is f, an f-number of the imaging lens assembly is Fno, and half of the maximal field of view of the imaging lens assembly is HFOV, these parameters have the following values: f=4.88 mm; Fno=1.80; and HFOV=36.5 degrees.

In the imaging lens assembly according to the 1st embodiment, when a central thickness of the first lens element 110 is CT1, a central thickness of the second lens element 120 is CT2, a central thickness of the fourth lens element 140 is CT4, a central thickness of the fifth lens element 150 is CT5, and an axial distance between the first lens element 110 and the second lens element 120 is T12, the following relationships are satisfied: CT1/CT2=3.68; CT4/CT5=0.77; and T12/CT1=0.09.

In the imaging lens assembly according to the 1st embodiment, when a curvature radius of the object-side surface 111 of the first lens element 110 is R1, and a curvature radius of the image-side surface 112 of the first lens element 110 is R2, the following relationship is satisfied: (R1+R2)/(R1−R2)=−1.67.

In the imaging lens assembly according to the 1st embodiment, when a curvature radius of the image-side surface 122 of the second lens element 120 is R4, and a focal length of the fourth lens element 140 is f4, the following relationship is satisfied: R4/f4=−0.20.

In the imaging lens assembly according to the 1st embodiment, when the focal length of the imaging lens assembly is f, a curvature radius of the object-side surface 141 of the fourth lens element 140 is R7, and a curvature radius of the image-side surface 142 of the fourth lens element 140 is R8, the following relationship is satisfied: f/|R7|+f/|R8|=0.54.

In the imaging lens assembly according to the 1st embodiment, when the focal length of the imaging lens assembly is f, a focal length of the first lens element 110 is f1, a focal length of the third lens element 130 is f3, the focal length of the fourth lens element 140 is f4, and a focal length of the fifth lens element 150 is f5, the following relationships are satisfied: f1/|f3|=0.19; and |f/f3|+|f/f4|+|f/f5|=0.60.

In the imaging lens assembly according to the 1st embodiment, when an axial distance between the object-side surface 111 of the first lens element 110 and the aperture stop 100 is Dr1s, and the central thickness of the first lens element 110 is CT1, the following relationship is satisfied: Dr1s/CT1=0.67.

FIG. 15 shows SAG11 and ET1 of the first lens element 110 of the imaging lens assembly according to FIG. 1. The dotted line of the first lens element 110 refers to the extension of the first lens element 110 which is outside of the effective area. In FIG. 15, a distance in a direction parallel with an optical axis from an axial vertex on the object-side surface 111 of the first lens element 110 to a maximum effective diameter position on the object-side surface 111 of the first lens element 110 is SAG11, and a shortest distance in a direction parallel with the optical axis between the object-side surface 111 of the first lens element 110 and the image-side surface 112 of the first lens element 110 is ET1 (In this embodiment, ET1 refers to a distance in a direction parallel with the optical axis from a maximum effective diameter position on the object-side surface 111 of the first lens element 110 to a maximum effective diameter position on the image-side surface 112 of the first lens element 110), the following relationship is satisfied: SAG11/ET1=2.04.

In the imaging lens assembly according to the 1st embodiment, when an axial distance between the object-side surface 111 of the first lens element 110 and the image-side surface 152 of the fifth lens element 150 is Td, and an entrance pupil diameter of the imaging lens assembly is EPD, the following relationship is satisfied: Td/EPD=1.70.

In the imaging lens assembly according to the 1st embodiment, when an axial distance between the object-side surface 111 of the first lens element 110 and the image plane 160 is TTL, and the focal length of the imaging lens assembly is f, the following relationship is satisfied: TTL/f=1.16.

In the imaging lens assembly according to the 1st embodiment, when the axial distance between the object-side surface 111 of the first lens element 110 and the image plane 160 is TTL, and an axial distance between the aperture stop 100 and the image plane 160 is SL, the following relationship is satisfied: SL/TTL=0.895.

The detailed optical data of the 1st embodiment are shown in Table 1 and the aspheric surface data are shown in Table 2 below.

TABLE 1

1st Embodiment
f = 4.88 mm, Fno = 1.80, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.594 | | | | |
| 2 | Lens 1 | 1.798 | ASP | 0.882 | Glass | 1.542 | 62.9 | 4.18 |
| 3 | | 7.201 | ASP | 0.075 | | | | |
| 4 | Lens 2 | 4.979 | ASP | 0.240 | Plastic | 1.639 | 23.5 | −11.00 |
| 5 | | 2.859 | ASP | 0.493 | | | | |
| 6 | Lens 3 | 40.855 | ASP | 0.484 | Plastic | 1.544 | 55.9 | 21.68 |
| 7 | | −16.521 | ASP | 0.608 | | | | |
| 8 | Lens 4 | −23.471 | ASP | 0.773 | Plastic | 1.639 | 23.5 | −14.10 |
| 9 | | 14.807 | ASP | 0.050 | | | | |
| 10 | Lens 5 | 2.238 | ASP | 1.000 | Plastic | 1.535 | 55.7 | 203.30 |
| 11 | | 1.929 | ASP | 0.500 | | | | |
| 12 | IR-cut filter | Plano | | 0.210 | Glass | 1.517 | 64.2 | — |
| 13 | | Plano | | 0.438 | | | | |
| 14 | Image | Plano | | — | | | | |

Note:
Reference wavelength (d-line) is 587.6 nm.

Note:
The effective radius of Surface 5 is 1.080 mm.

TABLE 2

Aspheric Coefficients

| Surface # | 2 | 3 | 4 | 5 | 6 |
|---|---|---|---|---|---|
| k = | 2.9408E−01 | −9.0000E+01 | −5.4424E+01 | −2.6073E+01 | −1.0011E+00 |
| A4 = | −1.9214E−03 | −1.1953E−01 | −1.9257E−01 | 1.0885E−02 | −1.8193E−01 |
| A6 = | −1.4670E−02 | 2.4468E−01 | 4.4207E−01 | 1.4977E−01 | 3.9521E−01 |
| A8 = | 2.6002E−02 | −2.6577E−01 | −5.2931E−01 | −2.1632E−01 | −1.2726E+00 |
| A10 = | −2.9377E−02 | 1.7479E−01 | 3.8894E−01 | 2.1079E−01 | 2.0786E+00 |
| A12 = | 1.6314E−02 | −6.4765E−02 | −1.5956E−01 | −1.1834E−01 | −1.7268E+00 |
| A14 = | −3.7527E−03 | 9.9116E−03 | 2.7814E−02 | 3.3559E−02 | 5.8013E−01 |

| Surface # | 7 | 8 | 9 | 10 | 11 |
|---|---|---|---|---|---|
| k = | 7.6444E+01 | −9.0000E+01 | −2.0237E+00 | −1.3227E+00 | −1.2942E+00 |
| A4 = | −5.6466E−02 | 6.5628E−02 | −1.8700E−02 | −1.7218E−01 | −1.0667E−01 |
| A6 = | 2.3146E−02 | −9.8180E−02 | −9.8119E−04 | 5.3682E−02 | 3.2413E−02 |
| A8 = | −8.9928E−02 | 5.4623E−02 | −4.3963E−04 | −1.0346E−02 | −8.3482E−03 |
| A10 = | 1.1113E−01 | −2.1924E−02 | −1.2102E−04 | 1.4191E−03 | 1.5088E−03 |
| A12 = | −6.8181E−02 | 4.1962E−03 | 8.3025E−05 | −1.3233E−04 | −1.6999E−04 |
| A14 = | 2.0117E−02 | −2.5866E−04 | −8.2615E−06 | 7.3028E−06 | 1.0431E−05 |
| A16 = | −1.8742E−03 | | | −1.7610E−07 | −2.6139E−07 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
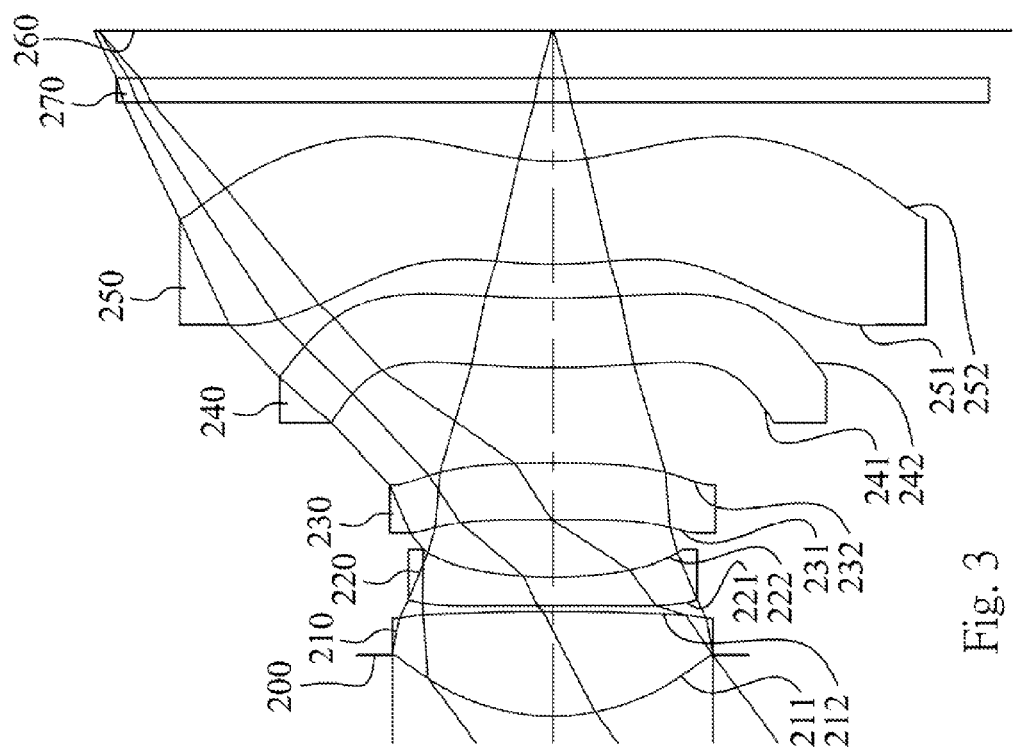
FIG. 3 is a schematic view of an imaging lens assembly according to the 2nd embodiment of the present disclosure.
Figure 4:
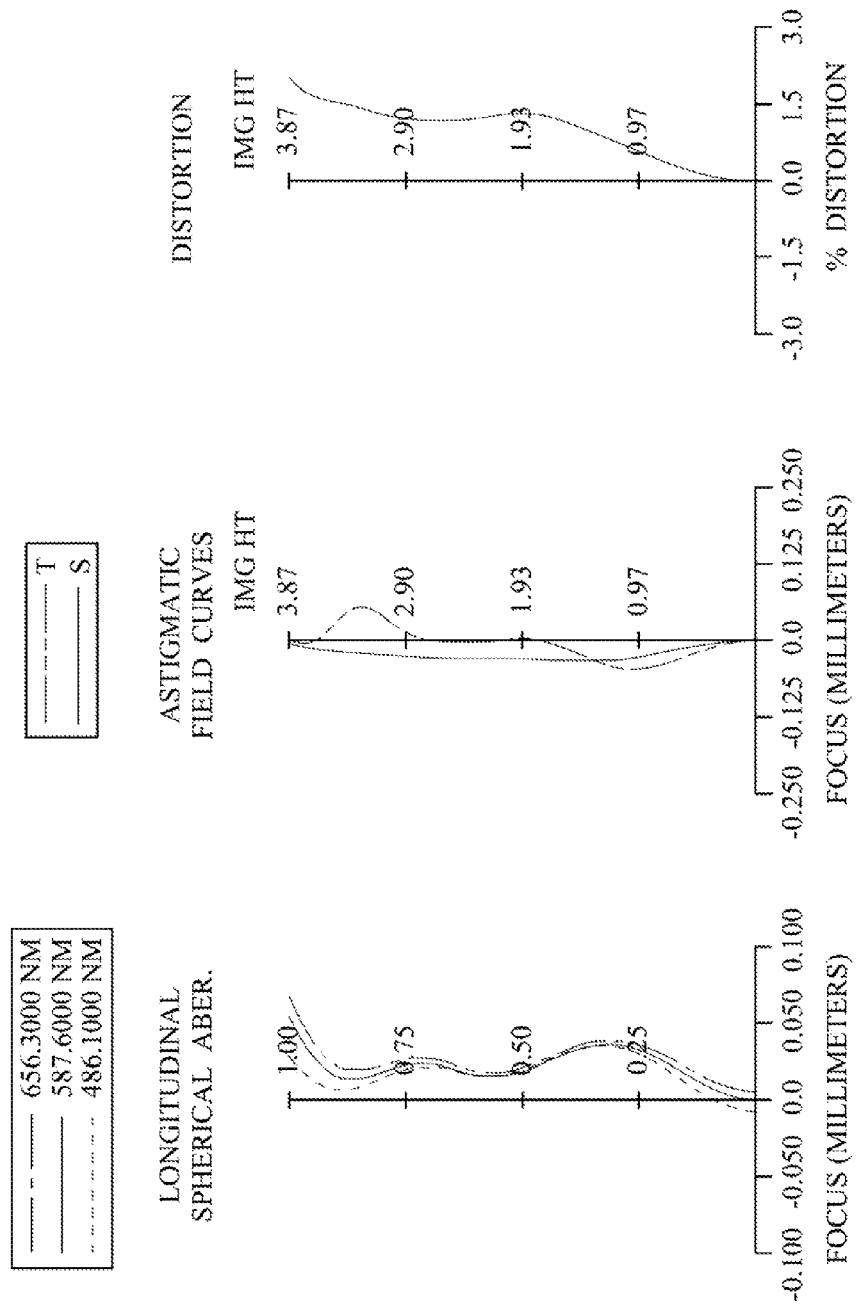
FIG. 4 shows, in order from left to right, spherical aberration curves, astigmatic field curves and a distortion curve of the imaging lens assembly according to the 2nd embodiment.

FIG. 3 is a schematic view of an imaging lens assembly according to the 2nd embodiment of the present disclosure. FIG. 4 shows, in order from left to right, spherical aberration curves, astigmatic field curves and a distortion curve of the imaging lens assembly according to the 2nd embodiment.

In FIG. 3, the imaging lens assembly includes, in order from an object side to an image side, an aperture stop 200, a first lens element 210, a second lens element 220, a third lens element 230, a fourth lens element 240, a fifth lens element 250, an IR-cut filter 270 and an image plane 260, wherein the imaging lens assembly has five non-cemented lens elements (210-250) with refractive power.

The first lens element 210 with positive refractive power has a convex object-side surface 211 and a convex image-side surface 212, which are both aspheric, and the first lens element 210 is made of plastic material.

The second lens element 220 with negative refractive power has a convex object-side surface 221 and a concave image-side surface 222, which are both aspheric, and the second lens element 220 is made of plastic material.

The third lens element 230 with positive refractive power has a convex object-side surface 231 and a convex image-side surface 232, which are both aspheric, and the third lens element 230 is made of plastic material.

The fourth lens element 240 with positive refractive power has a convex object-side surface 241 and a concave image-side surface 242, which are both aspheric, and the fourth lens element 240 is made of plastic material.

The fifth lens element 250 with negative refractive power has a convex object-side surface 251 and a concave image-side surface 252, which are both aspheric, and the fifth lens element 250 is made of plastic material. Moreover, the image-side surface 252 of the fifth lens element 250 has a convex shape at a peripheral region thereof.

The IR-cut filter 270 is made of glass and located between the fifth lens element 250 and the image plane 260, and will not affect the focal length of the imaging lens assembly.

The detailed optical data of the 2nd embodiment are shown in Table 3 and the aspheric surface data are shown in Table 4 below.

TABLE 3

2nd Embodiment
f = 5.10 mm, Fno = 1.87, HFOV = 36.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.524 | | | | |
| 2 | Lens 1 | 1.873 | ASP | 0.895 | Plastic | 1.544 | 55.9 | 3.38 |
| 3 | | −86.617 | ASP | 0.050 | | | | |
| 4 | Lens 2 | 21.596 | ASP | 0.241 | Plastic | 1.640 | 23.3 | −5.86 |
| 5 | | 3.182 | ASP | 0.490 | | | | |
| 6 | Lens 3 | 93.542 | ASP | 0.483 | Plastic | 1.544 | 55.9 | 26.29 |
| 7 | | −16.854 | ASP | 0.815 | | | | |
| 8 | Lens 4 | 8.302 | ASP | 0.591 | Plastic | 1.640 | 23.3 | 238.21 |
| 9 | | 8.537 | ASP | 0.288 | | | | |

TABLE 3-continued

2nd Embodiment
f = 5.10 mm, Fno = 1.87, HFOV = 36.5 deg.

| Surface # | | Curvature Radius | | Thickness | Material | Index | Abbe # | Focal Length |
|---|---|---|---|---|---|---|---|---|
| 10 | Lens 5 | 3.426 | ASP | 0.879 | Plastic | 1.535 | 55.7 | −10.82 |
| 11 | | 1.960 | ASP | 0.500 | | | | |
| 12 | IR-cut filter | Plano | | 0.210 | Glass | 1.517 | 64.2 | — |
| 13 | | Plano | | 0.401 | | | | |
| 14 | Image | Plano | | — | | | | |

Note:
Reference wavelength (d-line) is 587.6 nm.
Note:
The effective radius of Surface 5 is 1.100 mm.

TABLE 4

Aspheric Coefficients

| Surface # | 2 | 3 | 4 | 5 | 6 |
|---|---|---|---|---|---|
| k = | 1.2686E−01 | −8.5001E+01 | −6.1179E+01 | −2.3589E+01 | −1.0011E+00 |
| A4 = | −1.1343E−02 | −1.0368E−01 | −1.7453E−01 | −2.0048E−04 | −7.0918E−02 |
| A6 = | 2.3448E−02 | 2.2570E−01 | 4.0277E−01 | 1.3306E−01 | −3.7917E−02 |
| A8 = | −3.3650E−02 | −2.3860E−01 | −4.4514E−01 | −1.6095E−01 | 8.4299E−02 |
| A10 = | 2.0237E−02 | 1.3709E−01 | 2.8603E−01 | 1.2917E−01 | −8.4624E−02 |
| A12 = | −5.3233E−03 | −4.2672E−02 | −9.7066E−02 | −5.7769E−02 | 3.7734E−02 |
| A14 = | −1.7099E−04 | 5.3622E−03 | 1.3753E−02 | 1.5219E−02 | −2.7493E−03 |

| Surface # | 7 | 8 | 9 | 10 | 11 |
|---|---|---|---|---|---|
| k = | −4.4562E+01 | −9.0000E+01 | −9.6068E+00 | −1.2810E+00 | −1.2664E+00 |
| A4 = | −7.1834E−02 | 8.4372E−01 | −1.0456E−02 | −5.3391E+00 | −1.2089E−01 |
| A6 = | 3.8389E−02 | −7.6682E+00 | −1.8314E−01 | 6.3515E+00 | 3.9476E−02 |
| A8 = | −9.2529E−02 | 2.1444E+01 | 1.0801E−02 | −4.1495E−01 | −1.0319E−02 |
| A10 = | 1.2593E−01 | −3.9073E+01 | −3.8107E−03 | −5.7865E+00 | 1.7993E−03 |
| A12 = | −9.0103E−02 | 2.9840E+01 | 6.3652E−04 | 5.9720E+00 | −1.8703E−04 |
| A14 = | 3.3723E−02 | −5.6476E+00 | −3.9077E−05 | −2.5867E+00 | 1.0321E−05 |
| A16 = | −4.8569E−03 | | | 4.3087E−01 | −2.3024E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following relationships:

| 2nd Embodiment | | | |
|---|---|---|---|
| f [mm] | 5.10 | f/|R7| + f/|R8| | 1.21 |
| Fno | 1.87 | f1/|f3| | 0.13 |
| HFOV [deg.] | 36.5 | |f/f3| + |f/f4| + |f/f5| | 0.69 |
| CT1/CT2 | 3.71 | Dr1s/CT1 | 0.59 |
| CT4/CT5 | 0.67 | SAG11/ET1 | 1.76 |
| T12/CT1 | 0.06 | Td/EPD | 1.73 |
| (R1 + R2)/(R1 − R2) | −0.96 | TTL/f | 1.13 |
| R4/f4 | 0.01 | SL/TTL | 0.909 |

3rd Embodiment

Figure 5:
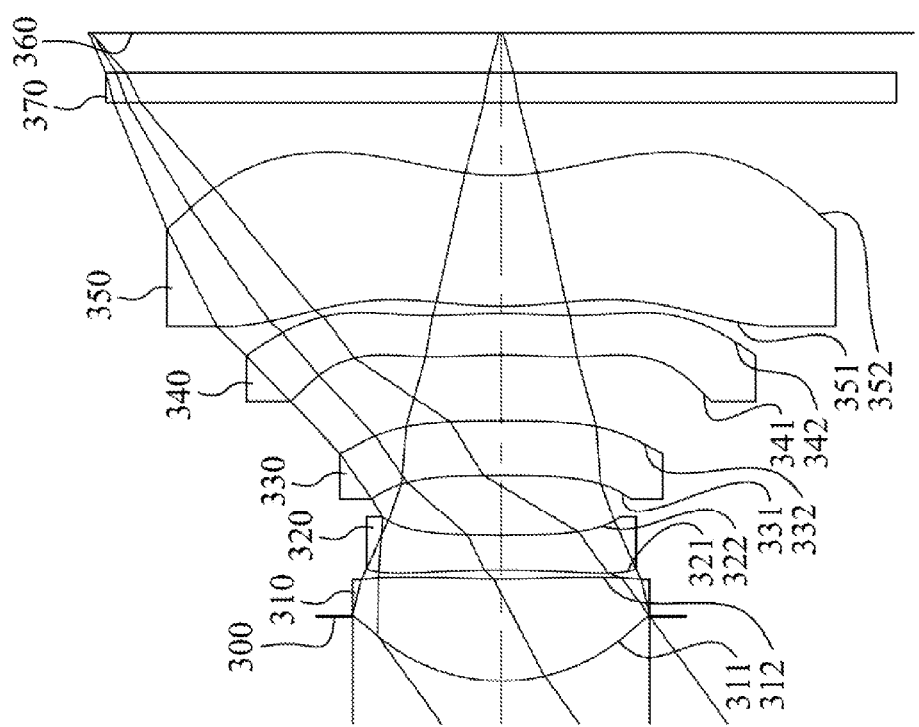
FIG. 5 is a schematic view of an imaging lens assembly according to the 3rd embodiment of the present disclosure.
Figure 6:
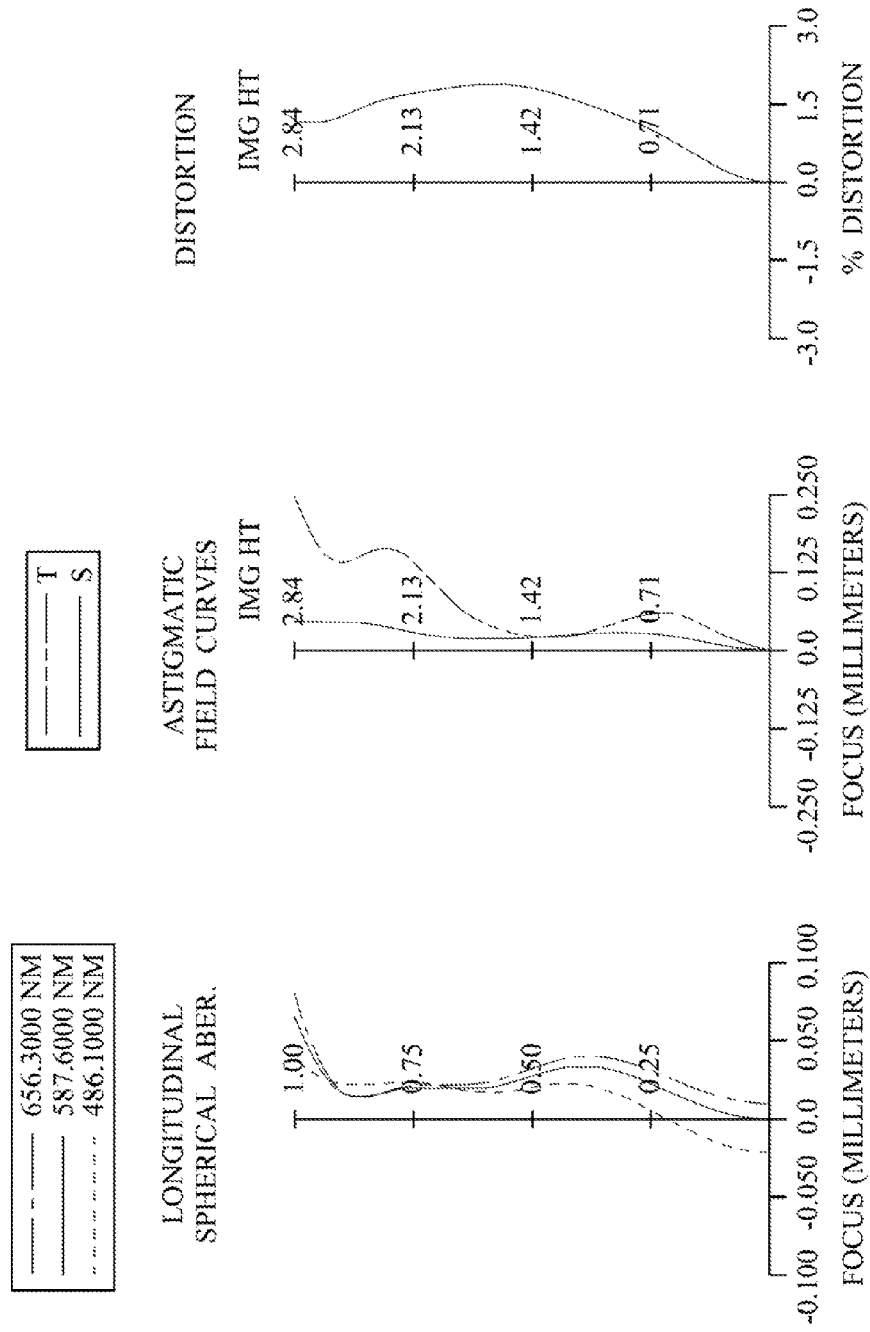
FIG. 6 shows, in order from left to right, spherical aberration curves, astigmatic field curves and a distortion curve of the imaging lens assembly according to the 3rd embodiment.

FIG. 5 is a schematic view of an imaging lens assembly according to the 3rd embodiment of the present disclosure. FIG. 6 shows, in order from left to right, spherical aberration curves, astigmatic field curves and a distortion curve of the imaging lens assembly according to the 3rd embodiment.

In FIG. 5, the imaging lens assembly includes, in order from an object side to an image side, an aperture stop 300, a first lens element 310, a second lens element 320, a third lens element 330, a fourth lens element 340, a fifth lens element 350, an IR-cut filter 370 and an image plane 360, wherein the imaging lens assembly has five non-cemented lens elements (310-350) with refractive power.

The first lens element 310 with positive refractive power has a convex object-side surface 311 and a concave image-side surface 312, which are both aspheric, and the first lens element 310 is made of plastic material.

The second lens element 320 with negative refractive power has a concave object-side surface 321 and a concave image-side surface 322, which are both aspheric, and the second lens element 320 is made of plastic material.

The third lens element 330 with positive refractive power has a concave object-side surface 331 and a convex image-side surface 332, which are both aspheric, and the third lens element 330 is made of plastic material.

The fourth lens element 340 with positive refractive power has a concave object-side surface 341 and a convex image-side surface 342, which are both aspheric, and the fourth lens element 340 is made of plastic material.

The fifth lens element 350 with negative refractive power has a convex object-side surface 351 and a concave image-side surface 352, which are both aspheric, and the fifth lens element 350 is made of plastic material. Moreover, the image-side surface 352 of the fifth lens element 350 has a convex shape at a peripheral region thereof.

The IR-cut filter 370 is made of glass and located between the fifth lens element 350 and the image plane 360, and will not affect the focal length of the imaging lens assembly.

The detailed optical data of the 3rd embodiment are shown in Table 5 and the aspheric surface data are shown in Table 6 below.

TABLE 5

3rd Embodiment
f = 3.87 mm, Fno = 1.88, HFOV = 35.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.450 | | | | |
| 2 | Lens 1 | 1.330 | ASP | 0.709 | Plastic | 1.544 | 55.9 | 2.93 |
| 3 | | 6.502 | ASP | 0.060 | | | | |
| 4 | Lens 2 | −12.681 | ASP | 0.240 | Plastic | 1.640 | 23.3 | −8.81 |
| 5 | | 10.224 | ASP | 0.418 | | | | |
| 6 | Lens 3 | −11.767 | ASP | 0.375 | Plastic | 1.633 | 23.4 | 207.44 |
| 7 | | −10.932 | ASP | 0.459 | | | | |
| 8 | Lens 4 | −3.527 | ASP | 0.285 | Plastic | 1.639 | 23.5 | 378.15 |
| 9 | | −3.586 | ASP | 0.050 | | | | |
| 10 | Lens 5 | 2.575 | ASP | 0.910 | Plastic | 1.535 | 55.7 | −11.12 |
| 11 | | 1.576 | ASP | 0.500 | | | | |
| 12 | IR-cut filter | Plano | | 0.210 | Glass | 1.517 | 64.2 | — |
| 13 | | Plano | | 0.281 | | | | |
| 14 | Image | Plano | | — | | | | |

Note:
Reference wavelength (d-line) is 587.6 nm.
Note:
The effective radius of Surface 5 is 0.820 mm.

TABLE 6

Aspheric Coefficients

| Surface # | 2 | 3 | 4 | 5 | 6 |
|---|---|---|---|---|---|
| k = | −7.1450E−02 | −6.5540E+01 | −9.0000E+01 | 9.6279E+00 | −8.9920E+01 |
| A4 = | 3.5469E−02 | −1.7958E−01 | −1.6079E−01 | 1.4239E−01 | −1.9760E−01 |
| A6 = | −1.4373E−01 | 3.2518E−01 | 5.1600E−01 | −3.5723E−01 | 5.9456E−01 |
| A8 = | 3.7318E−01 | −4.7696E−01 | −6.7201E−01 | 1.6820E+00 | −4.0997E+00 |
| A10 = | −5.4858E−01 | 6.1956E−01 | 7.6618E−01 | −2.2636E+00 | 1.3243E+01 |
| A12 = | 4.4861E−01 | −5.5436E−01 | −6.7184E−01 | 5.8057E−01 | −2.2898E+01 |
| A14 = | −1.7365E−01 | 1.9828E−01 | 3.0350E−01 | 8.2445E−01 | 2.0234E+01 |
| A16 = | | | | | −7.2309E+00 |

| Surface # | 7 | 8 | 9 | 10 | 11 |
|---|---|---|---|---|---|
| k = | 9.3874E+00 | −1.8874E+01 | −4.4350E+00 | −6.5829E−01 | −7.2259E+00 |
| A4 = | −2.6837E−02 | 5.2304E−01 | 4.4477E−01 | −2.6110E−01 | −3.8261E+00 |
| A6 = | −3.5066E−01 | −8.7047E−01 | −5.3357E−01 | 1.2459E−01 | 1.1691E+01 |
| A8 = | 5.6093E−01 | 7.6704E−01 | 3.2858E−01 | −4.0149E−02 | −3.3921E+01 |
| A10 = | −4.7307E−01 | −4.6948E−01 | −1.3271E−01 | 1.0119E−02 | 6.5328E+01 |
| A12 = | 1.6818E−01 | 1.7558E−01 | 3.4745E−02 | −1.7766E−03 | −7.5791E+01 |
| A14 = | 2.1242E−02 | −3.4156E−02 | −5.1603E−03 | 1.7882E−04 | 4.6178E+01 |
| A16 = | −1.7805E−02 | 2.6252E−03 | 3.1775E−04 | −7.5007E−06 | −1.0825E+01 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following relationships:

| 3rd Embodiment | | | |
|---|---|---|---|
| f [mm] | 3.87 | f/|R7| + f/|R8| | 2.18 |
| Fno | 1.88 | f1/|f3| | 0.01 |
| HFOV [deg.] | 35.8 | |f/f3| + |f/f4| + |f/f5| | 0.38 |
| CT1/CT2 | 2.95 | Dr1s/CT1 | 0.63 |
| CT4/CT5 | 0.31 | SAG11/ET1 | 1.86 |

-continued

| 3rd Embodiment | | | |
|---|---|---|---|
| T12/CT1 | 0.08 | Td/EPD | 1.70 |
| (R1 + R2)/(R1 − R2) | −1.51 | TTL/f | 1.14 |
| R4/f | 0.03 | SL/TTL | 0.898 |

4th Embodiment

Figure 7:
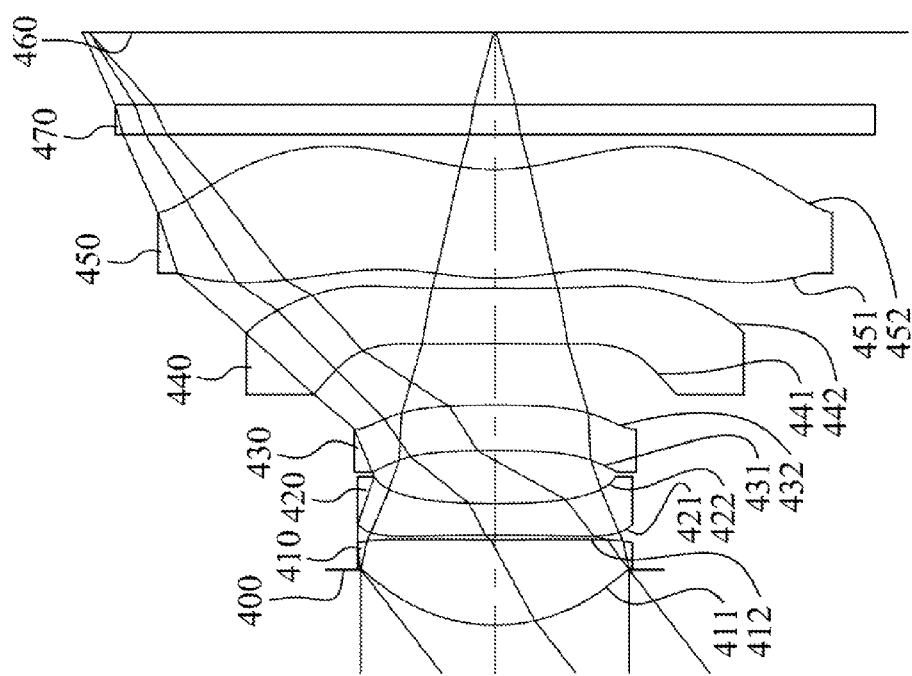
FIG. 7 is a schematic view of an imaging lens assembly according to the 4th embodiment of the present disclosure.
Figure 8:
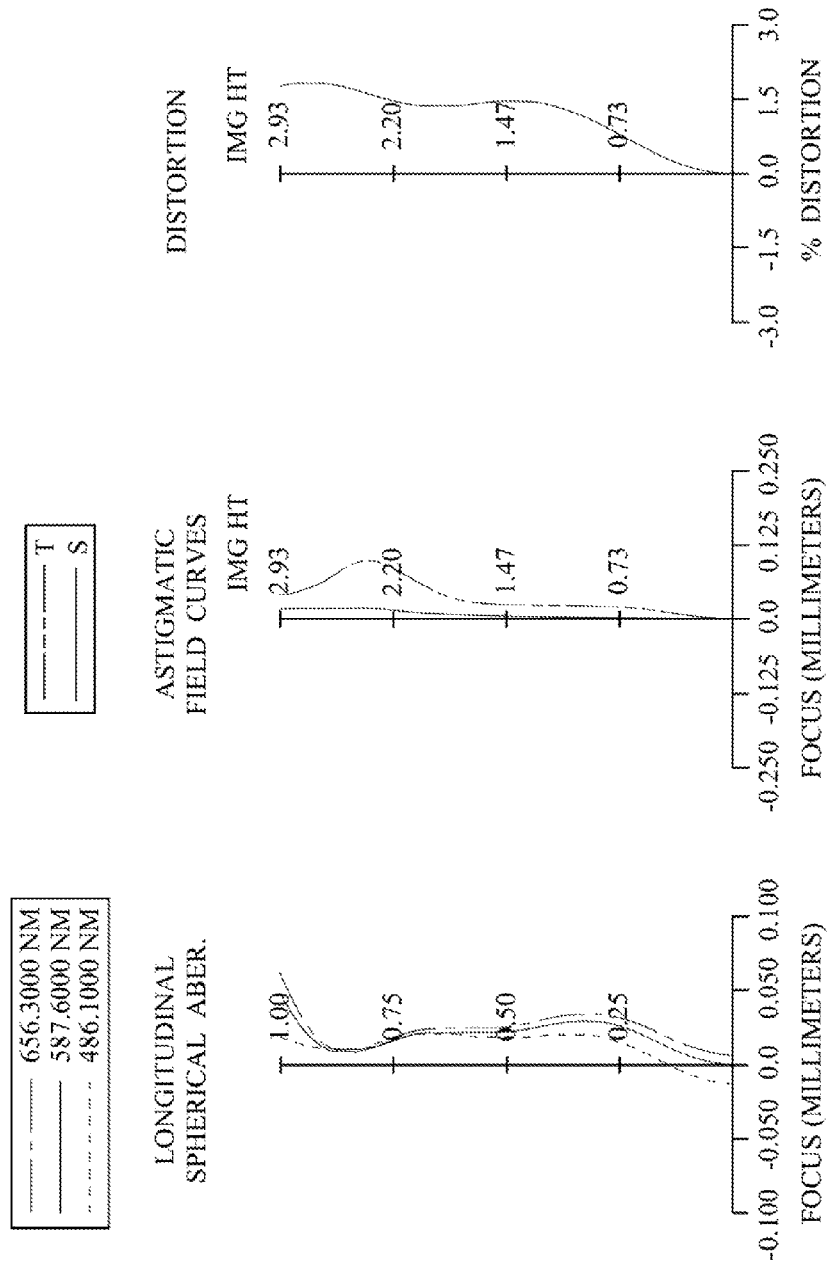
FIG. 8 shows, in order from left to right, spherical aberration curves, astigmatic field curves and a distortion curve of the imaging lens assembly according to the 4th embodiment.

FIG. 7 is a schematic view of an imaging lens assembly according to the 4th embodiment of the present disclosure. FIG. 8 shows, in order from left to right, spherical aberration curves, astigmatic field curves and a distortion curve of the imaging lens assembly according to the 4th embodiment.

In FIG. 7, the imaging lens assembly includes, in order from an object side to an image side, an aperture stop 400, a first lens element 410, a second lens element 420, a third lens element 430, a fourth lens element 440, a fifth lens element 450, an IR-cut filter 470 and an image plane 460, wherein the imaging lens assembly has five non-cemented lens elements (410-450) with refractive power.

The first lens element 410 with positive refractive power has a convex object-side surface 411 and a concave image-side surface 412, which are both aspheric, and the first lens element 410 is made of plastic material.

The second lens element 420 with negative refractive power has a concave object-side surface 421 and a concave image-side surface 422, which are both aspheric, and the second lens element 420 is made of plastic material.

The third lens element 430 with positive refractive power has a concave object-side surface 431 and a convex image-side surface 432, which are both aspheric, and the third lens element 430 is made of plastic material.

The fourth lens element 440 with negative refractive power has a concave object-side surface 441 and a convex image-side surface 442, which are both aspheric, and the fourth lens element 440 is made of plastic material.

The fifth lens element 450 with negative refractive power has a convex object-side surface 451 and a concave image-side surface 452, which are both aspheric, and the fifth lens element 450 is made of plastic material. Moreover, the image-side surface 452 of the fifth lens element 450 has a convex shape at a peripheral region thereof.

The IR-cut filter 470 is made of glass and located between the fifth lens element 450 and the image plane 460, and will not affect the focal length of the imaging lens assembly.

The detailed optical data of the 4th embodiment are shown in Table 7 and the aspheric surface data are shown in Table 8 below.

TABLE 7

4th Embodiment
f = 3.68 mm, Fno = 1.90, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.400 | | | | |
| 2 | Lens 1 | 1.306 | ASP | 0.612 | Plastic | 1.544 | 55.9 | 2.64 |
| 3 | | 11.883 | ASP | 0.035 | | | | |
| 4 | Lens 2 | −35.910 | ASP | 0.230 | Plastic | 1.640 | 23.3 | −6.47 |
| 5 | | 4.694 | ASP | 0.384 | | | | |
| 6 | Lens 3 | −11.327 | ASP | 0.328 | Plastic | 1.640 | 23.3 | 50.37 |
| 7 | | −8.476 | ASP | 0.447 | | | | |
| 8 | Lens 4 | −8.004 | ASP | 0.401 | Plastic | 1.640 | 23.3 | −23.28 |
| 9 | | −17.639 | ASP | 0.072 | | | | |
| 10 | Lens 5 | 1.927 | ASP | 0.786 | Plastic | 1.535 | 55.7 | −23.11 |
| 11 | | 1.430 | ASP | 0.255 | | | | |
| 12 | IR-cut filter | Plano | | 0.210 | Glass | 1.517 | 64.2 | — |
| 13 | | Plano | | 0.531 | | | | |
| 14 | Image | Plano | | — | | | | |

Note:
Reference wavelength (d-line) is 587.6 nm.

TABLE 8

Aspheric Coefficients

| Surface # | 2 | 3 | 4 | 5 | 6 |
|---|---|---|---|---|---|
| k = | 2.4186E−01 | −2.3581E+01 | −9.0000E+01 | −5.8244E+00 | 1.8332E+01 |
| A4 = | −4.9053E−02 | −1.4428E−01 | −1.1657E−01 | 6.8048E−03 | −1.5822E−01 |
| A6 = | 2.0590E−01 | 9.4878E−02 | 1.8968E−01 | 4.4766E−01 | 3.2306E−02 |
| A8 = | −5.8945E−01 | 5.9792E−01 | 6.1591E−01 | −1.3999E+00 | −1.6804E+00 |
| A10 = | 7.5749E−01 | −1.5585E+00 | −1.8818E+00 | 3.9920E+00 | 7.5530E+00 |
| A12 = | −4.0653E−01 | 1.4021E+00 | 1.8913E+00 | −4.4344E+00 | −1.5872E+01 |
| A14 = | | −4.5626E−01 | −6.0200E−01 | 2.5825E+00 | 1.6131E+01 |
| A16 = | | | | | −6.2299E+00 |

| Surface # | 7 | 8 | 9 | 10 | 11 |
|---|---|---|---|---|---|
| k = | −1.0000E+00 | −1.0000E+00 | −1.0008E+00 | −2.0153E+00 | −5.3673E+00 |
| A4 = | −7.4429E−02 | 3.5604E−01 | 1.9903E−01 | −3.4464E−01 | −1.3753E−01 |
| A6 = | −2.6255E−01 | −7.5381E−01 | −2.6454E−01 | 2.1562E−01 | 7.1525E−02 |
| A8 = | −6.7776E−02 | 7.5800E−01 | 1.4842E−01 | −7.7302E−02 | −3.3095E−02 |
| A10 = | 1.4277E+00 | −5.7420E−01 | −5.4414E−02 | 1.7566E−02 | 1.0500E−02 |
| A12 = | −2.7338E+00 | 2.5108E−01 | 1.4271E−02 | −2.4797E−03 | −2.0184E−03 |
| A14 = | 2.2394E+00 | −5.1088E−02 | −2.3343E−03 | 1.9874E−04 | 2.0890E−04 |
| A16 = | −6.4504E−01 | 3.9700E−03 | 1.6311E−04 | −6.9048E−06 | −8.7935E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following relationships:

| 4th Embodiment | | | |
|---|---|---|---|
| f [mm] | 3.68 | f/|R7| + f/|R8| | 0.67 |
| Fno | 1.90 | f1/|f3| | 0.05 |
| HFOV [deg.] | 38.0 | |f/f3| + |f/f4| + |f/f5| | 0.39 |
| CT1/CT2 | 2.66 | Dr1s/CT1 | 0.65 |
| CT4/CT5 | 0.51 | SAG11/ET1 | 2.24 |
| T12/CT1 | 0.06 | Td/EPD | 1.70 |
| (R1 + R2)/(R1 − R2) | −1.25 | TTL/f | 1.15 |
| R4/f4 | −0.20 | SL/TTL | 0.905 |

5th Embodiment

Figure 9:
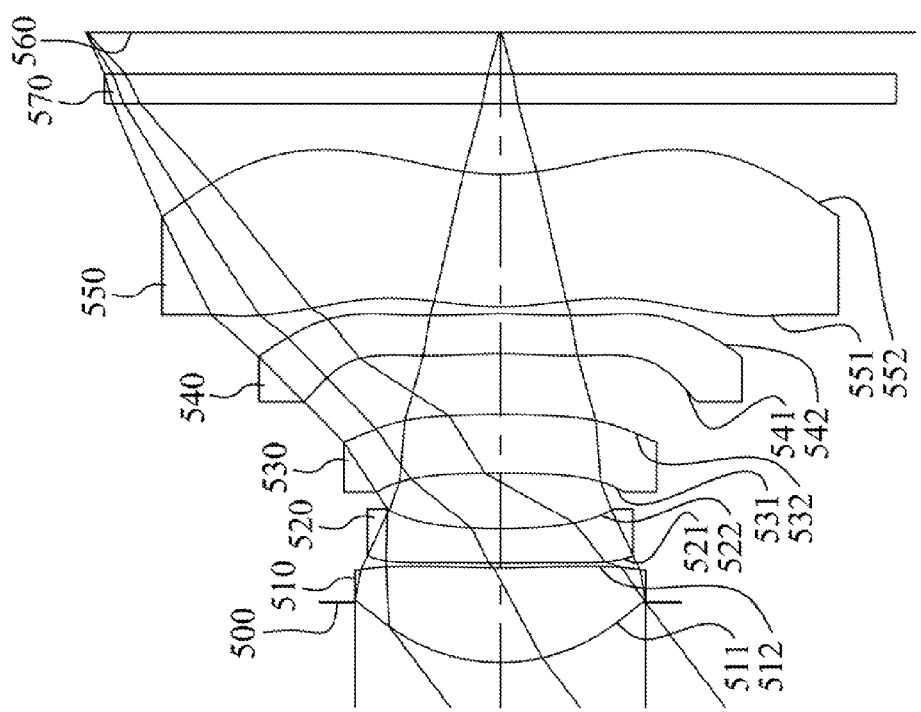
FIG. 9 is a schematic view of an imaging lens assembly according to the 5th embodiment of the present disclosure.
Figure 10:
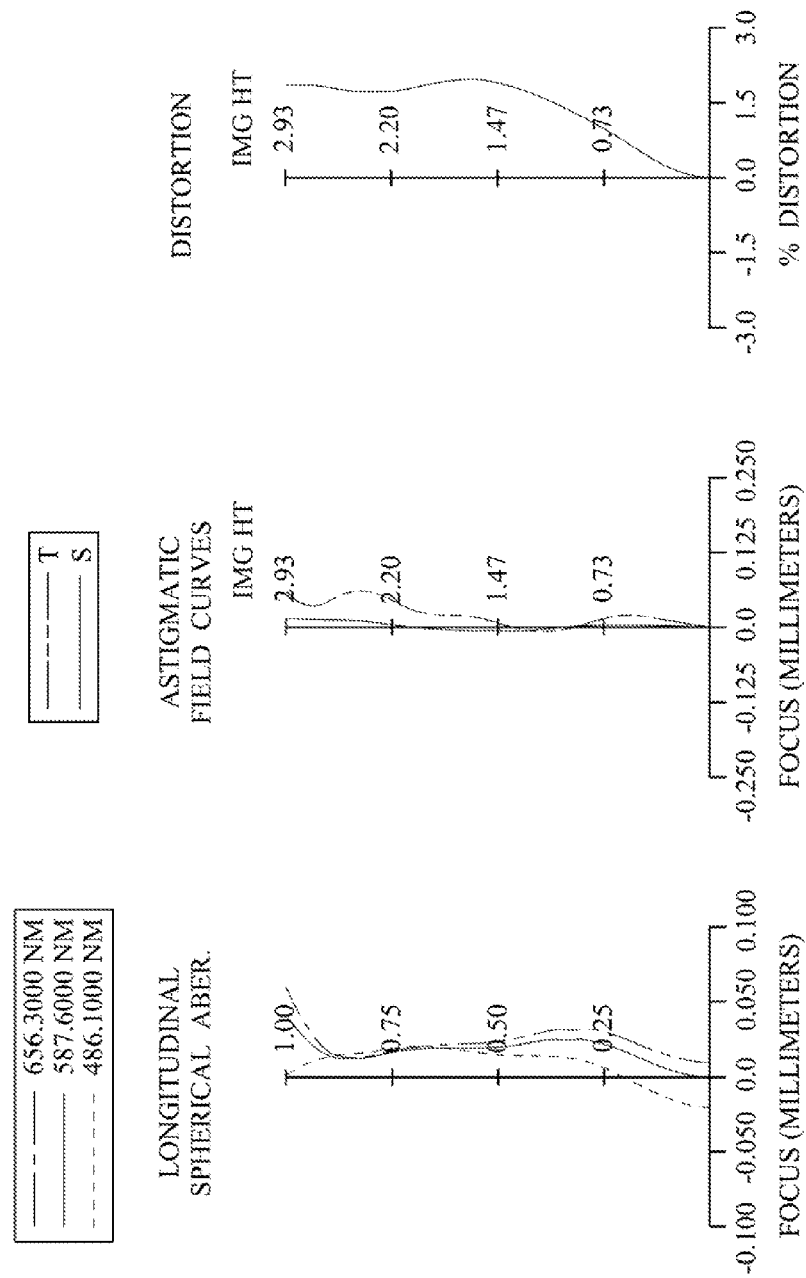
FIG. 10 shows, in order from left to right, spherical aberration curves, astigmatic field curves and a distortion curve of the imaging lens assembly according to the 5th embodiment.

FIG. 9 is a schematic view of an imaging lens assembly according to the 5th embodiment of the present disclosure. FIG. 10 shows, in order from left to right, spherical aberration curves, astigmatic field curves and a distortion curve of the imaging lens assembly according to the 5th embodiment.

In FIG. 9, the imaging lens assembly includes, in order from an object side to an image side, an aperture stop 500, a first lens element 510, a second lens element 520, a third lens element 530, a fourth lens element 540, a fifth lens element 550, an IR-cut filter 570 and an image plane 560, wherein the imaging lens assembly has five non-cemented lens elements (510-550) with refractive power.

The first lens element 510 with positive refractive power has a convex object-side surface 511 and a concave image-side surface 512, which are both aspheric, and the first lens element 510 is made of plastic material.

The second lens element 520 with negative refractive power has a convex object-side surface 521 and a concave image-side surface 522, which are both aspheric, and the second lens element 520 is made of plastic material.

The third lens element 530 with positive refractive power has a concave object-side surface 531 and a convex image-side surface 532, which are both aspheric, and the third lens element 530 is made of plastic material.

The fourth lens element 540 with negative refractive power has a concave object-side surface 541 and a convex image-side surface 542, which are both aspheric, and the fourth lens element 540 is made of plastic material.

The fifth lens element 550 with negative refractive power has a convex object-side surface 551 and a concave image-side surface 552, which are both aspheric, and the fifth lens element 550 is made of plastic material. Moreover, the image-side surface 552 of the fifth lens element 550 has a convex shape at a peripheral region thereof.

The IR-cut filter 570 is made of glass and located between the fifth lens element 550 and the image plane 560, and will not affect the focal length of the imaging lens assembly.

The detailed optical data of the 5th embodiment are shown in Table 9 and the aspheric surface data are shown in Table 10 below.

TABLE 9

5th Embodiment
f = 3.81 mm, Fno = 1.85, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.427 | | | | |
| 2 | Lens 1 | 1.330 | ASP | 0.671 | Plastic | 1.544 | 55.9 | 3.02 |
| 3 | | 5.757 | ASP | 0.035 | | | | |
| 4 | Lens 2 | 9.951 | ASP | 0.240 | Plastic | 1.640 | 23.3 | −9.10 |
| 5 | | 3.640 | ASP | 0.396 | | | | |
| 6 | Lens 3 | −12.181 | ASP | 0.412 | Plastic | 1.640 | 23.3 | 90.86 |
| 7 | | −10.204 | ASP | 0.436 | | | | |
| 8 | Lens 4 | −3.335 | ASP | 0.279 | Plastic | 1.640 | 23.3 | −24.73 |
| 9 | | −4.364 | ASP | 0.050 | | | | |
| 10 | Lens 5 | 2.118 | ASP | 0.942 | Plastic | 1.535 | 55.7 | −39.18 |
| 11 | | 1.625 | ASP | 0.500 | | | | |
| 12 | IR-cut filter | Plano | | 0.210 | Glass | 1.517 | 64.2 | — |
| 13 | | Plano | | 0.298 | | | | |
| 14 | Image | Plano | | — | | | | |

Note:
Reference wavelength (d-line) is 587.6 nm.
Note:
The effective radius of Surface 5 is 0.800 mm.

TABLE 10

| Aspheric Coefficients | | | | | |
|---|---|---|---|---|---|
| Surface # | 2 | 3 | 4 | 5 | 6 |
| k = | −1.1416E−01 | −5.8953E+01 | −9.7797E+00 | 5.3714E+00 | 4.9961E+01 |
| A4 = | −1.0979E−02 | −2.2292E−01 | −2.7402E−01 | −4.6631E−02 | −9.9642E−02 |
| A6 = | 9.7823E−02 | 2.4390E−01 | 5.3913E−01 | 4.1085E−01 | −1.7866E−01 |

TABLE 10-continued

| Aspheric Coefficients | | | | | |
|---|---|---|---|---|---|
| A8 = | −2.4707E−01 | 2.3006E−01 | −2.2238E−01 | −9.4177E−01 | −1.8505E−01 |
| A10 = | 3.1149E−01 | −8.1408E−01 | −2.7768E−01 | 2.4440E+00 | 2.2319E+00 |
| A12 = | −1.7129E−01 | 6.7843E−01 | 3.2828E−01 | −3.5046E+00 | −5.3944E+00 |
| A14 = | | −1.9755E−01 | −4.9743E−02 | 2.1830E+00 | 5.5891E+00 |
| A16 = | | | | | −2.1932E+00 |

| Surface # | 7 | 8 | 9 | 10 | 11 |
|---|---|---|---|---|---|
| k = | −5.0000E+01 | −3.5300E+01 | −8.0309E−01 | −9.9492E−01 | −6.0121E+00 |
| A4 = | −2.9254E−02 | 4.4471E−01 | 3.8249E−01 | −2.9245E−01 | −9.7686E−02 |
| A6 = | −2.7109E−01 | −7.1216E−01 | −4.8748E−01 | 1.2653E−01 | 4.1954E−02 |
| A8 = | 3.1653E−01 | 4.9087E−01 | 3.3457E−01 | −2.4314E−02 | −1.6855E−02 |
| A10 = | −9.6114E−02 | −1.4305E−01 | −1.5823E−01 | 1.0199E−03 | 4.5323E−03 |
| A12 = | −1.3844E−01 | −5.9019E−02 | 4.8308E−02 | 3.9274E−04 | −7.4884E−04 |
| A14 = | 1.5024E−01 | 5.1749E−02 | −8.0959E−03 | −6.2736E−05 | 6.8996E−05 |
| A16 = | −3.9550E−02 | −9.3977E−03 | 5.4659E−04 | 2.6935E−06 | −2.6620E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following relationships:

| 5th Embodiment | | | |
|---|---|---|---|
| f [mm] | 3.81 | f/|R7| + f/|R8| | 2.02 |
| Fno | 1.85 | f1/|f3| | 0.03 |
| HFOV [deg.] | 37.0 | |f/f3| + |f/f4| + |f/f5| | 0.29 |
| CT1/CT2 | 2.80 | Dr1s/CT1 | 0.64 |
| CT4/CT5 | 0.30 | SAG11/ET1 | 2.02 |
| T12/CT1 | 0.05 | Td/EPD | 1.68 |
| (R1 + R2)/(R1 − R2) | −1.60 | TTL/f | 1.15 |
| R4/f4 | −0.15 | SL/TTL | 0.903 |

6th Embodiment

Figure 11:
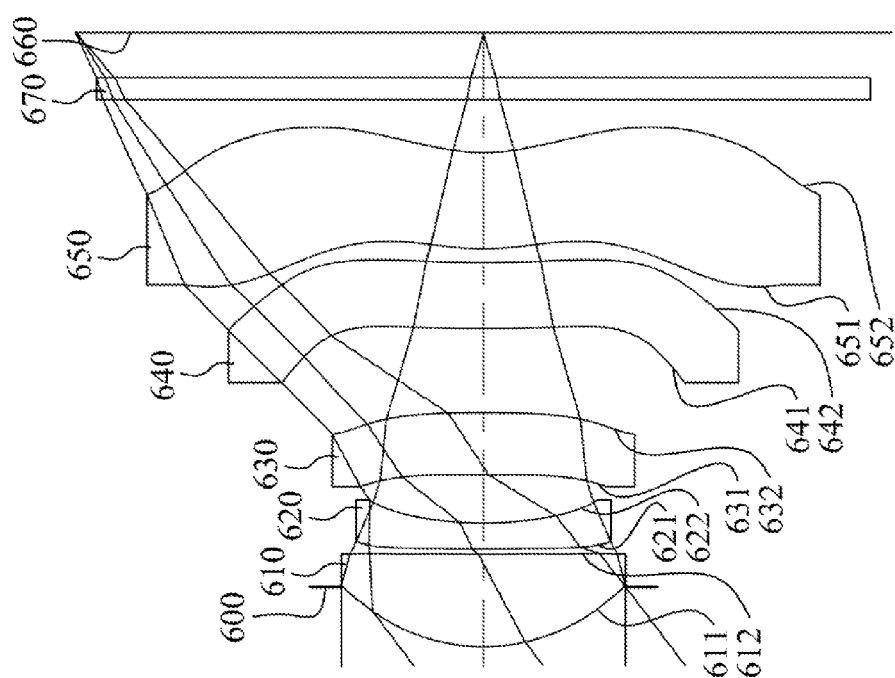
FIG. 11 is a schematic view of an imaging lens assembly according to the 6th embodiment of the present disclosure.
Figure 12:
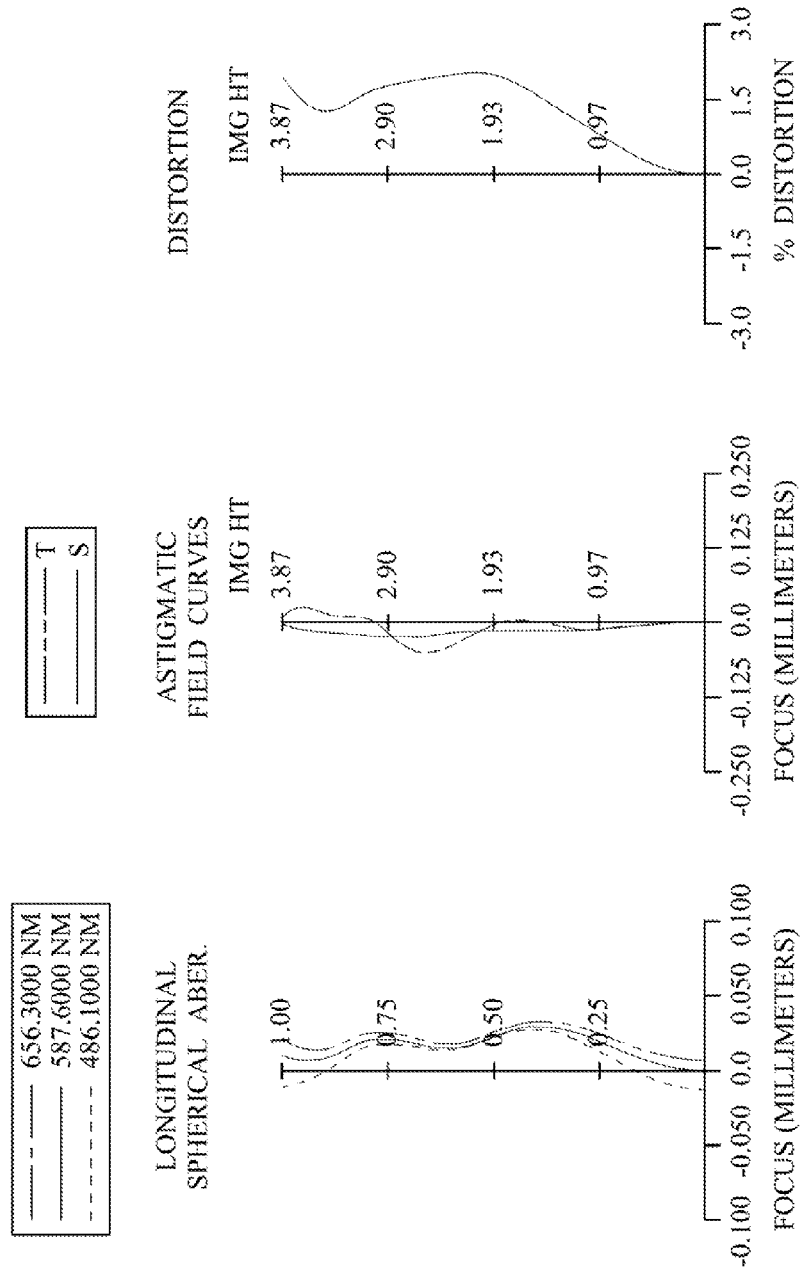
FIG. 12 shows, in order from left to right, spherical aberration curves, astigmatic field curves and a distortion curve of the imaging lens assembly according to the 6th embodiment.

FIG. 11 is a schematic view of an imaging lens assembly according to the 6th embodiment of the present disclosure. FIG. 12 shows, in order from left to right, spherical aberration curves, astigmatic field curves and a distortion curve of the imaging lens assembly according to the 6th embodiment.

In FIG. 11, the imaging lens assembly includes, in order from an object side to an image side, an aperture stop 600, a first lens element 610, a second lens element 620, a third lens element 630, a fourth lens element 640, a fifth lens element 650, an IR-cut filter 670 and an image plane 660, wherein the imaging lens assembly has five non-cemented lens elements (610-650) with refractive power.

The first lens element 610 with positive refractive power has a convex object-side surface 611 and a concave image-side surface 612, which are both aspheric, and the first lens element 610 is made of plastic material.

The second lens element 620 with negative refractive power has a convex object-side surface 621 and a concave image-side surface 622, which are both aspheric, and the second lens element 620 is made of plastic material.

The third lens element 630 with positive refractive power has a convex object-side surface 631 and a convex image-side surface 632, which are both aspheric, and the third lens element 630 is made of plastic material.

The fourth lens element 640 with negative refractive power has a convex object-side surface 641 and a concave image-side surface 642, which are both aspheric, and the fourth lens element 640 is made of plastic material.

The fifth lens element 650 with negative refractive power has a convex object-side surface 651 and a concave image-side surface 652, which are both aspheric, and the fifth lens element 650 is made of plastic material. Moreover, the image-side surface 652 of the fifth lens element 650 has a convex shape at a peripheral region thereof.

The IR-cut filter 670 is made of glass and located between the fifth lens element 650 and the image plane 660, and will not affect the focal length of the imaging lens assembly.

The detailed optical data of the 6th embodiment are shown in Table 11 and the aspheric surface data are shown in Table 12 below.

TABLE 11

6th Embodiment
f = 5.00 mm, Fno = 1.85, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.569 | | | | |
| 2 | Lens 1 | 1.824 | ASP | 0.880 | Plastic | 1.544 | 55.9 | 3.71 |
| 3 | | 15.801 | ASP | 0.050 | | | | |
| 4 | Lens 2 | 9.601 | ASP | 0.240 | Plastic | 1.640 | 23.3 | −7.33 |
| 5 | | 3.121 | ASP | 0.461 | | | | |
| 6 | Lens 3 | 51.094 | ASP | 0.590 | Plastic | 1.544 | 55.9 | 22.41 |
| 7 | | −15.955 | ASP | 0.801 | | | | |
| 8 | Lens 4 | 27.356 | ASP | 0.631 | Plastic | 1.640 | 23.3 | −20.46 |

TABLE 11-continued

6th Embodiment
f = 5.00 mm, Fno = 1.85, HFOV = 37.1 deg.

| Surface # | | Curvature Radius | | Thickness | Material | Index | Abbe # | Focal Length |
|---|---|---|---|---|---|---|---|---|
| 9 | | 8.774 | ASP | 0.130 | | | | |
| 10 | Lens 5 | 2.339 | ASP | 0.916 | Plastic | 1.535 | 55.7 | −43.30 |
| 11 | | 1.835 | ASP | 0.500 | | | | |
| 12 | IR-cut filter | Plano | | 0.210 | Glass | 1.517 | 64.2 | — |
| 13 | | Plano | | 0.433 | | | | |
| 14 | Image | Plano | | — | | | | |

Note:
Reference wavelength (d-line) is 587.6 nm.
Note:
The effective radius of Surface 5 is 1.080 mm.

TABLE 12

Aspheric Coefficients

| Surface # | 2 | 3 | 4 | 5 | 6 |
|---|---|---|---|---|---|
| k = | 2.2340E−01 | −8.9999E+01 | −7.3511E+01 | −2.3381E+01 | −1.0011E+00 |
| A4 = | −2.6070E−03 | −1.3946E−01 | −2.0683E−01 | 3.8118E−04 | −6.9388E−02 |
| A6 = | −9.3550E−03 | 2.8721E−01 | 4.5958E−01 | 1.2991E−01 | 1.6281E−02 |
| A8 = | 2.3699E−02 | −3.0892E−01 | −5.1513E−01 | −1.4404E−01 | −4.8624E−02 |
| A10 = | −3.0566E−02 | 1.9273E−01 | 3.4658E−01 | 1.0978E−01 | 6.5608E−02 |
| A12 = | 1.7446E−02 | −6.5902E−02 | −1.2642E−01 | −4.8835E−02 | −4.5554E−02 |
| A14 = | −4.1308E−03 | 9.1372E−03 | 1.9521E−02 | 1.4492E−02 | 1.3495E−02 |

| Surface # | 7 | 8 | 9 | 10 | 11 |
|---|---|---|---|---|---|
| k = | −4.4562E+01 | −9.0000E+01 | −1.6491E+01 | −2.2774E+00 | −1.1897E+00 |
| A4 = | −4.7029E−02 | 4.4497E−02 | −4.0421E−02 | −1.9536E−01 | −1.3139E−01 |
| A6 = | 3.0596E−03 | −7.3932E−02 | 1.8388E−02 | 8.2077E−02 | 4.7759E−02 |
| A8 = | −3.5700E−02 | 4.5358E−02 | −7.4170E−03 | −2.3539E−02 | −1.3510E−02 |
| A10 = | 6.0347E−02 | −1.9083E−02 | 7.9377E−04 | 4.5076E−03 | 2.5149E−03 |
| A12 = | −4.5285E−02 | 3.8855E−03 | 6.5298E−05 | −5.1991E−04 | −2.8022E−04 |
| A14 = | 1.6965E−02 | −2.8249E−04 | −1.0991E−05 | 3.2402E−05 | 1.6674E−05 |
| A16 = | −2.3989E−03 | | | −8.3937E−07 | −4.0343E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following relationships:

| 6th Embodiment | | | |
|---|---|---|---|
| f [mm] | 5.00 | f/|R7| + f/|R8| | 0.75 |
| Fno | 1.85 | f1/|f3| | 0.17 |
| HFOV [deg.] | 37.1 | |f/f3| + |f/f4| + |f/f5| | 0.58 |
| CT1/CT2 | 3.67 | Dr1s/CT1 | 0.65 |
| CT4/CT5 | 0.69 | SAG11/ET1 | 1.93 |
| T12/CT1 | 0.06 | Td/EPD | 1.74 |
| (R1 + R2)/(R1 − R2) | −1.26 | TTL/f | 1.16 |
| R4/f4 | −0.15 | SL/TTL | 0.901 |

7th Embodiment

Figure 13:
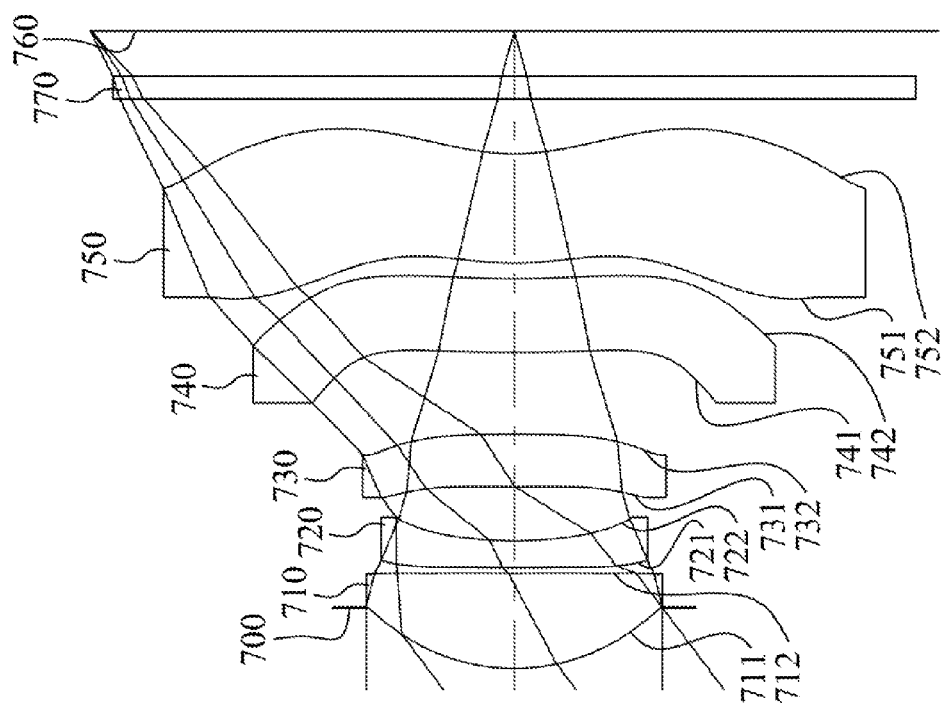
FIG. 13 is a schematic view of an imaging lens assembly according to the 7th embodiment of the present disclosure.
Figure 14:
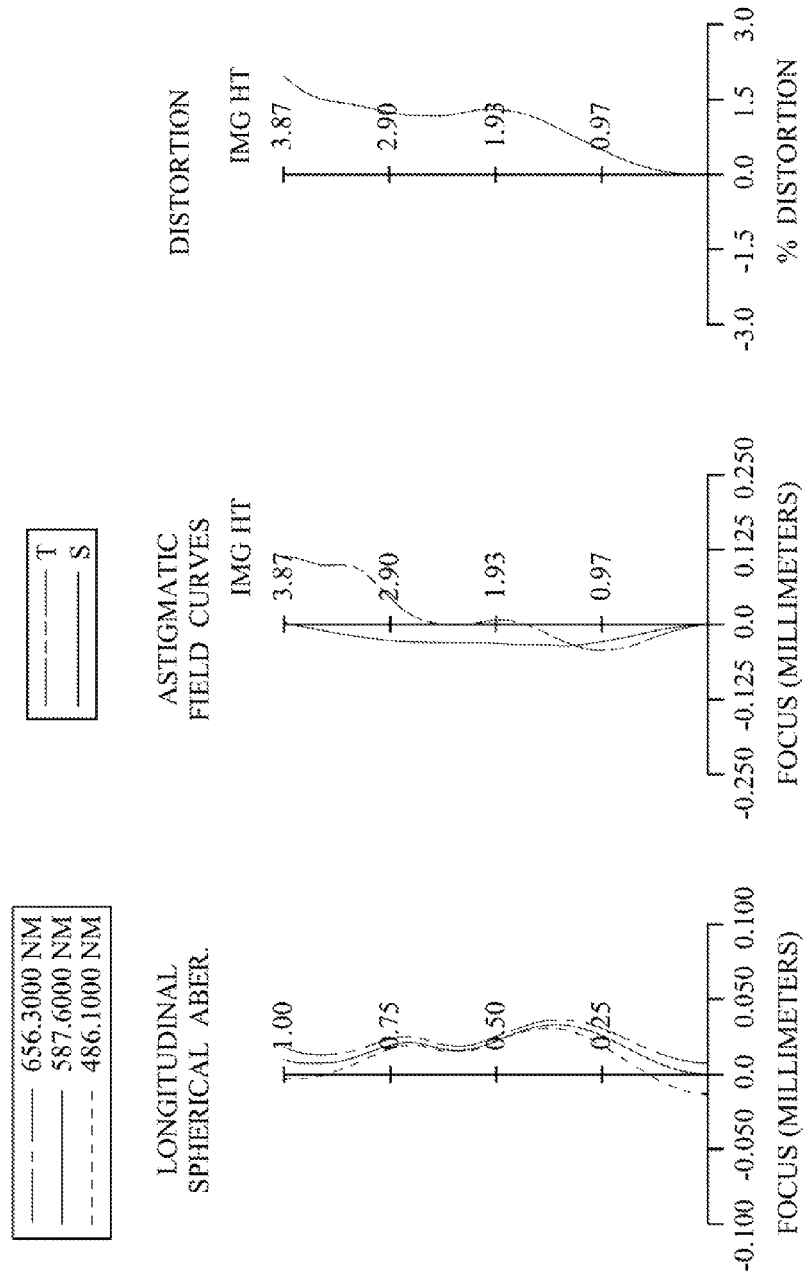
FIG. 14 shows, in order from left to right, spherical aberration curves, astigmatic field curves and a distortion curve of the imaging lens assembly according to the 7th embodiment.

FIG. 13 is a schematic view of an imaging lens assembly according to the 7th embodiment of the present disclosure. FIG. 14 shows, in order from left to right, spherical aberration curves, astigmatic field curves and a distortion curve of the imaging lens assembly according to the 7th embodiment.

In FIG. 13, the imaging lens assembly includes, in order from an object side to an image side, an aperture stop 700, a first lens element 710, a second lens element 720, a third lens element 730, a fourth lens element 740, a fifth lens element 750, an IR-cut filter 770 and an image plane 760, wherein the imaging lens assembly has five non-cemented lens elements (710-750) with refractive power.

The first lens element 710 with positive refractive power has a convex object-side surface 711 and a concave image-side surface 712, which are both aspheric, and the first lens element 710 is made of plastic material.

The second lens element 720 with negative refractive power has a convex object-side surface 721 and a concave image-side surface 722, which are both aspheric, and the second lens element 720 is made of plastic material.

The third lens element 730 with positive refractive power has a convex object-side surface 731 and a convex image-side surface 732, which are both aspheric, and the third lens element 730 is made of plastic material.

The fourth lens element 740 with negative refractive power has a convex object-side surface 741 and a concave image-side surface 742, which are both aspheric, and the fourth lens element 740 is made of plastic material.

The fifth lens element 750 with negative refractive power has a convex object-side surface 751 and a concave image-side surface 752, which are both aspheric, and the fifth lens element 750 is made of plastic material. Moreover, the image-side surface 752 of the fifth lens element 750 has a convex shape at a peripheral region thereof.

The IR-cut filter 770 is made of glass and located between the fifth lens element 750 and the image plane 760, and will not affect the focal length of the imaging lens assembly.

The detailed optical data of the 7th embodiment are shown in Table 13 and the aspheric surface data are shown in Table 14 below.

TABLE 13

7th Embodiment
f = 5.01 mm, Fno = 1.85, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.555 | | | | |
| 2 | Lens 1 | 1.840 | ASP | 0.873 | Plastic | 1.544 | 55.9 | 3.70 |
| 3 | | 17.644 | ASP | 0.050 | | | | |
| 4 | Lens 2 | 10.784 | ASP | 0.240 | Plastic | 1.640 | 23.3 | −7.50 |
| 5 | | 3.291 | ASP | 0.502 | | | | |
| 6 | Lens 3 | 35.300 | ASP | 0.475 | Plastic | 1.544 | 55.9 | 24.45 |
| 7 | | −21.254 | ASP | 0.755 | | | | |
| 8 | Lens 4 | 22.719 | ASP | 0.674 | Plastic | 1.640 | 23.3 | −22.12 |
| 9 | | 8.619 | ASP | 0.142 | | | | |
| 10 | Lens 5 | 2.619 | ASP | 1.000 | Plastic | 1.535 | 55.7 | −32.34 |
| 11 | | 1.972 | ASP | 0.500 | | | | |
| 12 | IR-cut filter | Plano | | 0.210 | Glass | 1.517 | 64.2 | — |
| 13 | | Plano | | 0.418 | | | | |
| 14 | Image | Plano | | — | | | | |

Note:
Reference wavelength (d-line) is 587.6 nm.
Note:
The effective radius of Surface 5 is 1.080 mm.

TABLE 14

Aspheric Coefficients

| Surface # | 2 | 3 | 4 | 5 | 6 |
|---|---|---|---|---|---|
| k = | 1.7825E−01 | −8.5001E+01 | −6.1179E+01 | −2.3589E+01 | −1.0011E+00 |
| A4 = | −8.3116E−03 | −1.5026E−01 | −2.0838E−01 | 3.3906E−03 | −5.9126E−02 |
| A6 = | 5.5574E−03 | 3.3610E−01 | 5.0437E−01 | 1.3833E−01 | −5.3748E−02 |
| A8 = | 3.1122E−03 | −4.0317E−01 | −6.3101E−01 | −1.9318E−01 | 1.0206E−01 |
| A10 = | −1.5075E−02 | 2.8168E−01 | 4.7625E−01 | 1.9178E−01 | −9.8054E−02 |
| A12 = | 1.1300E−02 | −1.0684E−01 | −1.9446E−01 | −1.0669E−01 | 4.3631E−02 |
| A14 = | −3.0976E−03 | 1.6440E−02 | 3.2979E−02 | 2.8746E−02 | −4.4546E−03 |

| Surface # | 7 | 8 | 9 | 10 | 11 |
|---|---|---|---|---|---|
| k = | −4.4562E+01 | −9.0000E+01 | −9.6068E+00 | −1.5074E+00 | −1.1856E+00 |
| A4 = | −5.9451E−02 | 4.3324E−02 | −3.3241E−02 | −1.7609E−01 | −1.1436E−01 |
| A6 = | 1.7446E−02 | −8.2050E−02 | 5.4628E−03 | 5.8841E−02 | 3.7276E−02 |
| A8 = | −7.8978E−02 | 5.4507E−02 | −5.1298E−02 | −1.2990E−02 | −9.8546E−03 |
| A10 = | 1.2259E−01 | −2.4008E−02 | −9.4162E−04 | 2.1218E−03 | 1.7534E−03 |
| A12 = | −9.1665E−02 | 5.0433E−03 | 2.8417E−04 | −2.3089E−04 | −1.8742E−04 |
| A14 = | 3.4472E−02 | −3.7451E−04 | −2.2377E−05 | 1.4341E−05 | 1.0723E−05 |
| A16 = | −4.8569E−03 | | | −3.8063E−07 | −2.5030E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following relationships:

| 7th Embodiment | | | |
|---|---|---|---|
| f [mm] | 5.01 | f/|R7| + f/|R8| | 0.80 |
| Fno | 1.85 | f1/|f3| | 0.15 |
| HFOV [deg.] | 37.0 | |f/f3| + |f/f4| + |f/f5| | 0.59 |
| CT1/CT2 | 3.64 | Dr1s/CT1 | 0.64 |

-continued

| 7th Embodiment | | | |
|---|---|---|---|
| CT4/CT5 | 0.67 | SAG11/ET1 | 1.89 |
| T12/CT1 | 0.06 | Td/EPD | 1.74 |
| (R1 + R2)/(R1 − R2) | −1.23 | TTL/f | 1.15 |
| R4/f4 | −0.15 | SL/TTL | 0.904 |

It is to be noted that TABLES 1-14 show different data of the different embodiments; however, the data of the different embodiments are obtained from experiments. Therefore, any imaging lens system of the same structure is considered to be less than or equal to the scope of the present disclosure even if it uses different data. The embodiments depicted above and the appended drawings are exemplary and are not intended to limit the scope of the present disclosure.

What is claimed is:

1. An imaging lens assembly comprising five non-cemented lens elements with refractive power, in order from an object side to an image side:
   a first lens element with positive refractive power having a convex object-side surface;
   a second lens element having refractive power,
   a third lens element with refractive power having a convex image-side surface;
   a fourth lens element having refractive power; and
   a fifth lens element with refractive power having a concave image-side surface at a paraxial region thereof, wherein the image-side surface of the fifth lens element has a convex shape at a peripheral region thereof, and both of an object-side surface and the image-side surface of the fifth lens element are aspheric;
   wherein the imaging lens assembly has a total of five lens elements with refractive power, and further comprising a stop located between an imaged object and the first lens element, a distance in a direction parallel with an optical axis from an axial vertex on the object-side surface of the first lens element to a maximum effective diameter position on the object-side surface of the first lens element is SAG11, a shortest distance in a direction parallel with the optical axis between the object-side surface of the first lens element and an image-side surface of the first lens element is ET1, a focal length of the first lens element is f1, a focal length of the third lens element is f3, a curvature radius of an image-side surface of the second lens element is R4, a focal length of the fourth lens element is f4, an axial distance between the object-side surface of the first lens element and an image plane is TTL, an axial distance between the stop and the image plane is SL, and following relationships are satisfied:

$1.85 < SAG11/ET1 < 5.0$;

$0 < |f1|/|f3| < 0.8$;

$R4/f4 < 0$; and $0.85 < SL/TTL < 0.95$.

2. The imaging lens assembly of claim 1, wherein the second lens element has negative refractive power.

3. The imaging lens assembly of claim 2, wherein the axial distance between the object-side surface of the first lens element and the image plane is TTL, a focal length of the imaging lens assembly is f, and the following relationship is satisfied:

$TTL/f < 1.25$.

4. The imaging lens assembly of claim 2, wherein an axial distance between the first lens element and the second lens element is T12, a central thickness of the first lens element is CT1, and the following relationship is satisfied:

$0.02 < T12/CT1 < 0.15$.

5. The imaging lens assembly of claim 2, wherein a curvature radius of the object-side surface of the first lens element is R1, a curvature radius of the image-side surface of the first lens element is R2, and the following relationship is satisfied:

$-2.0 < (R1+R2)/(R1-R2) < -0.90$.

6. The imaging lens assembly of claim 2, wherein the object-side surface of the fifth lens element is convex.

7. The imaging lens assembly of claim 2, wherein an axial distance between the object-side surface of the first lens element and the image-side surface of the fifth lens element is Td, an entrance pupil diameter of the imaging lens assembly is EPD, and the following relationship is satisfied:

$1.3 < Td/EPD < 1.85$.

8. The imaging lens assembly of claim 2, wherein an axial distance between the object-side surface of the first lens element and the stop is Dr1s, a central thickness of the first lens element is CT1, and the following relationship is satisfied:

$0.50 < Dr1s/CT1 < 0.85$.

9. The imaging lens assembly of claim 1, wherein a focal length of the imaging lens assembly is f, the focal length of the third lens element is f3, the focal length of the fourth lens element is f4, a focal length of the fifth lens element is f5, and the following relationship is satisfied:

$0 < |f/f3| + |f/f4| + |f/f5| < 2.0$.

10. The imaging lens assembly of claim 9, wherein the focal length of the imaging lens assembly is f, the focal length of the third lens element is f3, the focal length of the fourth lens element is f4, the focal length of the fifth lens element is f5, and the following relationship is satisfied:

$0.2 < |f/f3| + |f/f4| + |f/f5| < 1.0$.

11. The imaging lens assembly of claim 9, wherein a central thickness of the fourth lens element is CT4, a central thickness of the fifth lens element is CT5, and the following relationship is satisfied:

$0.15 < CT4/CT5 < 0.90$.

12. The imaging lens assembly of claim 1, wherein a central thickness of the first lens element is CT1, a central thickness of the second lens element is CT2, and the following relationship is satisfied:

$2.5 < CT1/CT2 < 4.5$.

13. The imaging lens assembly of claim 1, wherein an axial distance between the object-side surface of the first lens element and the image-side surface of the fifth lens element is Td, an entrance pupil diameter of the imaging lens assembly is EPD, and the following relationship is satisfied:

$1.3 < Td/EPD < 2.0$.

14. The imaging lens assembly of claim 1, wherein the distance in the direction parallel with the optical axis from the axial vertex on the object-side surface of the first lens element to the maximum effective diameter position on the object-side surface of the first lens element is SAG11, the shortest distance in a direction parallel with the optical axis between the object-side surface of the first lens element and the image-side surface of the first lens element is ET1, and the following relationship is satisfied:

$1.85 < SAG11/ET1 < 3.0$.

15. An imaging lens assembly comprising five non-cemented lens elements with refractive power, in order from an object side to an image side:
    a first lens element with positive refractive power having a convex object-side surface;

a second lens element having refractive power;
a third lens element having refractive power;
a fourth lens element having refractive power; and
a fifth lens element with refractive power having a concave image-side surface at a paraxial region thereof, wherein the image-side surface of the fifth lens element has a convex shape at a peripheral region thereof, and both of an object-side surface and the image-side surface of the fifth lens element are aspheric;
wherein the imaging lens assembly has a total of five lens elements with refractive power, and further comprises a stop located between an imaged object and the first lens element, a distance in a direction parallel with an optical axis from an axial vertex on the object-side surface of the first lens element to a maximum effective diameter position on the object-side surface of the first lens element is SAG11, a shortest distance in a direction parallel with the optical axis between the object-side surface of the first lens element and an image-side surface of the first lens element is ET1, a focal length of the first lens element is f1, a focal length of the third lens element is f3, an axial distance between the object-side surface of the first lens element and the stop is Dr1s, a central thickness of the first lens element is CT1, a curvature radius of the object-side surface of the first lens element is R1, a curvature radius of the image-side surface of the first lens element is R2, and the following relationships are satisfied:

$1.75 < SAG11/ET1$;

$0 < |f1/f3| < 0.8$;

$0.50 < Dr1s/CT1 < 0.85$; and $-2.0 < (R1+R2)/(R1-R2) < -0.90$.

16. The imaging lens assembly of claim 15, wherein the axial distance between the object-side surface of the first lens element and the stop is Dr1s, the central thickness of the first lens element is CT1, and the following relationship is satisfied:

$0.60 < Dr1s/CT1 < 0.80$.

17. The imaging lens assembly of claim 15, wherein an axial distance between the object-side surface of the first lens element and the image-side surface of the fifth lens element is Td, an entrance pupil diameter of the imaging lens assembly is EPD, and the following relationship is satisfied:

$1.3 < Td/EPD < 2.2$.

18. The imaging lens assembly of claim 17, wherein the axial distance between the object-side surface of the first lens element and the image-side surface of the fifth lens element is Td, the entrance pupil diameter of the imaging lens assembly is EPD, and the following relationship is satisfied:

$1.3 < Td/EPD < 2.0$.

19. The imaging lens assembly of claim 15, wherein a focal length of the imaging lens assembly is f, the focal length of the third lens element is f3, a focal length of the fourth lens element is f4, a focal length of the fifth lens element is f5, and the following relationship is satisfied:

$0 < |f/f3| + |f/f4| + |f/f5| < 2.0$.

20. The imaging lens assembly of claim 15, wherein the distance in the direction parallel with the optical axis from the axial vertex on the object-side surface of the first lens element to the maximum effective diameter position on the object-side surface of the first lens element is SAG11, the shortest distance in a direction parallel with the optical axis between the object-side surface of the first lens element and the image-side surface of the first lens element is ET1, and the following relationship is satisfied:

$1.85 < SAG11/ET1 < 3.0$.

21. The imaging lens assembly of claim 15, wherein the central thickness of the first lens element is CT1, a central thickness of the second lens element is CT2, and the following relationship is satisfied:

$2.5 < CT1/CT2 < 4.5$.

22. The imaging lens assembly of claim 15, wherein the second lens element with negative refractive power has a concave image-side surface.

23. The imaging lens assembly of claim 15, wherein a focal length of the imaging lens assembly is f, a curvature radius of an object-side surface of the fourth lens element is R7, a curvature radius of an image-side surface of the fourth lens element is R8, and the following relationship is satisfied:

$0 < f/|R7| + f/|R8| < 3.0$.

24. The imaging lens assembly of claim 15, wherein an axial distance between the object-side surface of the first lens element and an image plane is TTL, a focal length of the imaging lens assembly is f, and the following relationship is satisfied:

$TTL/f < 1.25$.

25. An imaging lens assembly comprising five non-cemented lens elements with refractive power, in order from an object side to an image side:
a first lens element with positive refractive power having a convex object-side surface;
a second lens element having refractive power;
a third lens element having refractive power;
a fourth lens element with refractive power having a convex image-side surface; and
a fifth lens element with refractive power having a concave image-side surface at a paraxial region thereof, wherein the image-side surface of the fifth lens element has a convex shape at a peripheral region thereof, and both of an object-side surface and the image-side surface of the fifth lens element are aspheric;
wherein the imaging lens assembly has a total of five lens elements with refractive power, and further comprises a stop located between an imaged object and the first lens element, a distance in a direction parallel with an optical axis from an axial vertex on the object-side surface of the first lens element to a maximum effective diameter position on the object-side surface of the first lens element is SAG11, a shortest distance in a direction parallel with the optical axis between the object-side surface of the first lens element and an image-side surface of the first lens element is ET1, a focal length of the first lens element is f1, a focal length of the third lens element is f3, an axial distance between the object-side surface of the first lens element and the stop is Dr1s, a central thickness of the first lens element is CT1, and the following relationships are satisfied:

$1.75 < SAG11/ET1$;

$0 < |f1/f3| < 0.8$; and $0.50 < Dr1s/CT1 < 0.85$.

26. The imaging lens assembly of claim 25, wherein the axial distance between the object-side surface of the first lens element and the stop is Dr1s, the central thickness of the first lens element is CT1 and the following relationship is satisfied:

$$0.60 < Dr1s/CT1 < 0.80.$$

27. The imaging lens assembly of claim 25, wherein an axial distance between the object-side surface of the first lens element and the image-side surface of the fifth lens element is Td, an entrance pupil diameter of the imaging lens assembly is EPD, and the following relationship is satisfied:

$$1.3 < Td/EPD < 2.2.$$

28. The imaging lens assembly of claim 27, wherein the axial distance between the object-side surface of the first lens element and the image-side surface of the fifth lens element is Td, the entrance pupil diameter of the imaging lens assembly is EPD, and the following relationship is satisfied:

$$1.3 < Td/EPD < 2.0.$$

29. The imaging lens assembly of claim 25, wherein a focal length of the imaging lens assembly is f, the focal length of the third lens element is f3, a focal length of the fourth lens element is f4, a focal length of the fifth lens element is f5, and the following relationship is satisfied:

$$0 < |f/f3| + |f/f5| < 2.0.$$

30. The imaging lens assembly of claim 25, wherein the distance in the direction parallel with the optical axis from the axial vertex on the object-side surface of the first lens element to the maximum effective diameter position on the object-side surface of the first lens element is SAG11, the shortest distance in a direction parallel with the optical axis between the object-side surface of the first lens element and the image-side surface of the first lens element is ET1, and the following relationship is satisfied:

$$1.85 < SAG11/ET1 < 3.0.$$

31. The imaging lens assembly of claim 25, wherein the central thickness of he first. lens element is CT1, a central thickness of the second lens element is CT2, and the following relationship is satisfied:

$$2.5 CT1/CT2 < 4.5.$$

32. The imaging lens assembly of clam 25, wherein the second lens element with negative refractive power has a concave image-side surface.

33. The imaging lens assembly of claim 25, wherein a curvature radius of the object-side surface of the first lens element is R1, a curvature radius of the image-side surface of the first lens element is R2, and the following relationship is satisfied:

$$-2.0 < (R1+R2)/(R1-R2) < -0.90.$$

34. The imaging lens assembly of claim 25, wherein a focal length of the imaging lens assembly is f, a curvature radius of an object-side surface of the fourth lens element is R7, a curvature radius of the image-side surface of the fourth lens element is R8, and the following relationship is satisfied:

$$0 < f/|R7| + f/|R8| < 3.0.$$

35. The imaging lens assembly of claim 25, wherein an axial distance between the object-side surface of the first lens element and an image plane is TTL, a focal length of the imaging lens assembly is f, and the following relationship is satisfied:

$$TTL/f < 1.25.$$

* * * * *

UNITED STATES PATENT AND TRADEMARK OFFICE
CERTIFICATE OF CORRECTION

| | |
|---|---|
| PATENT NO. | : 9,052,491 B2 |
| APPLICATION NO. | : 13/861380 |
| DATED | : June 9, 2015 |
| INVENTOR(S) | : Tang et al. |

It is certified that error appears in the above-identified patent and that said Letters Patent is hereby corrected as shown below:

In the Specification (1) In column 1, line 66 to column 2, line 2 of the issued patent reads as "a shortest distance in a direction parallel with the optical axis between the object-side surface of the first lens element and the image-side surface of the first lens element is ET1", but it should read as "a shortest distance in a direction parallel with the optical axis between an effective area of the object-side surface of the first lens element and an effective area of the image-side surface of the first lens element is ET1".

(2) In column 2, lines 34-37 of the issued patent reads as "a shortest distance in a direction parallel with the optical axis between the object-side surface of the first lens element and the image-side surface of the first lens element is ET1", but it should read as "a shortest distance in a direction parallel with the optical axis between an effective area of the object-side surface of the first lens element and an effective area of the image-side surface of the first lens element is ET1".

(3) In column 4, lines 7-13 of the issued patent reads as "a shortest distance in a direction parallel with the optical axis between the object-side surface of the first lens element and the image-side surface of the first lens element is ET1 (The range of ET1 is not limited to the effective area on both of the object-side surface and the image-side surface of the first lens element.)", but it should read as "a shortest distance in a direction parallel with the optical axis between an effective area of the object-side surface of the first lens element and an effective area of the image-side surface of the first lens element is ET1".

(4) In column 8, lines 12-15 of the issued patent reads as "a shortest distance in a direction parallel with the optical axis between the object-side surface 111 of the first lens element 110 and the image-side surface 112 of the first lens element 110 is ET1", but it should read as "a shortest distance in a direction parallel with the optical axis between the effective area of the object-side surface 111 of the first lens element 110 and the effective area of the image-side surface 112 of the first lens element 110 is ET1".

Signed and Sealed this
Nineteenth Day of January, 2016

Michelle K. Lee
*Director of the United States Patent and Trademark Office*

CERTIFICATE OF CORRECTION (continued)
U.S. Pat. No. 9,052,491 B2

In the Claims (5) In column 25, lines 33-36, claim 1 of the issued patent reads as "a shortest distance in a direction parallel with the optical axis between the object-side surface of the first lens element and the image-side surface of the first lens element is ET1", but it should read as "a shortest distance in a direction parallel with the optical axis between an effective area of the object-side surface of the first lens element and an effective area of the image-side surface of the first lens element is ET1".

(6) In column 26, lines 56-59, claim 14 of the issued patent reads as "the shortest distance in a direction parallel with the optical axis between the object-side surface of the first lens element and the image-side surface of the first lens element is ET1", but it should read as "the shortest distance in a direction parallel with the optical axis between the effective area of the object-side surface of the first lens element and the effective area of the image-side surface of the first lens element is ET1".

(7) In column 27, lines 17-20, claim 15 of the issued patent reads as "a shortest distance in a direction parallel with the optical axis between the object-side surface of the first lens element and the image-side surface of the first lens element is ET1", but it should read as "a shortest distance in a direction parallel with the optical axis between an effective area of the object-side surface of the first lens element and an effective area of the image-side surface of the first lens element is ET1".

(8) In column 28, lines 1-4, claim 20 of the issued patent reads as "the shortest distance in a direction parallel with the optical axis between the object-side surface of the first lens element and the image-side surface of the first lens element is ET1", but it should read as "the shortest distance in a direction parallel with the optical axis between the effective area of the object-side surface of the first lens element and the effective area of the image-side surface of the first lens element is ET1".

(9) In column 28, lines 53-56, claim 25 of the issued patent reads as "a shortest distance in a direction parallel with the optical axis between the object-side surface of the first lens element and the image-side surface of the first lens element is ET1", but it should read as "a shortest distance in a direction parallel with the optical axis between an effective area of the object-side surface of the first lens element and an effective area of the image-side surface of the first lens element is ET1".

(10) In column 29, line 27, claim 29 of the issued patent reads as "$0<|f/f3|+|f/f5|<2.0$", but it should read as "$0<|f/f3|+|f/f4|+|f/f5|<2.0$".

(11) In column 29, line 33 to column 30, line 2, claim 30 of the issued patent reads as "the shortest distance in a direction parallel with the optical axis between the object-side surface of the first lens element and the image-side surface of the first lens element is ET1", but it should read as "the shortest distance in a direction parallel with the optical axis between the effective area of the object-side surface of the first lens element and the effective area of the image-side surface of the first lens element is ET1".

(12) In column 30, line 7, Claim 31 of the issued patent reads as "central thickness of he first lens element...", but it should read as "central thickness of the first lens element".

(13) In column 30, line 10, Claim 31 of the issued patent reads as "$2.5CT1/CT2<4.5$", but it should read as "$2.5<CT1/CT2<4.5$".